US012694215B2

(12) United States Patent
Mehta et al.

(10) Patent No.: US 12,694,215 B2
(45) Date of Patent: Jul. 28, 2026

(54) HIERARCHICAL NAMED ENTITY RECOGNITION WITH MULTI-TASK SETUP

(71) Applicant: Oracle International Corporation, Redwood Shores, CA (US)

(72) Inventors: Saransh Mehta, Navi Mumbai (IN); Siddhant Jain, Bangalore (IN); Pramir Sarkar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 222 days.

(21) Appl. No.: 17/966,485

(22) Filed: Oct. 14, 2022

(65) Prior Publication Data

US 2023/0401385 A1 Dec. 14, 2023

Related U.S. Application Data

(60) Provisional application No. 63/351,700, filed on Jun. 13, 2022.

(51) Int. Cl.
*G06F 40/295* (2020.01)
*G06F 40/126* (2020.01)
*G06N 5/022* (2023.01)

(52) U.S. Cl.
CPC .......... *G06F 40/295* (2020.01); *G06F 40/126* (2020.01); *G06N 5/022* (2013.01)

(58) Field of Classification Search
CPC ...... G06F 40/295; G06F 40/30; G06F 16/367; G06F 40/40; G06F 16/3329;
(Continued)

(56) References Cited

U.S. PATENT DOCUMENTS 8,768,969 B2 * 7/2014 Huerta .................. G06F 40/279
                                              707/804
9,715,496 B1 * 7/2017 Sapoznik ................ H04L 51/02
(Continued)

OTHER PUBLICATIONS

"Few-Nerd: A Few-shot Named Entity Recognition Dataset", Available Online at: https://github.com/thunlp/Few-NERD#get-the-data, GitHub-thunlp/Few-NERD: Code and data of AGL 2021 paper, Accessed from Internet on Mar. 29, 2022, pp. 1-7.
(Continued)

*Primary Examiner* — Jakieda R Jackson
(74) *Attorney, Agent, or Firm* — Kilpatrick Townsend & Stockton LLP

(57) ABSTRACT

A novel system is described for performing hierarchical named entity recognition ("HNER") processing that includes identifying categories at different hierarchical levels for a named entity. The HNER system uses a novel architecture comprising an encoder model and a system of trained machine learning (ML) models to perform the HNER processing, where each trained model in the system of ML models corresponds to a particular hierarchical level, and each model is trained to extract one or more named entities and predict a category for each extracted named entity for the corresponding hierarchical level. Novel techniques are also described for training the various models in HNER system including an encoder model and models in the system of models.

20 Claims, 11 Drawing Sheets

(58) Field of Classification Search
CPC ............... G06F 16/3344; G06F 16/288; G06F
16/9027; G06F 40/284; G06F 40/20;
G06F 18/2431; G06F 40/126; G06N
20/00; G06N 5/022; G10L 15/063
See application file for complete search history.

(56) References Cited

U.S. PATENT DOCUMENTS

| | | | | |
|---|---|---|---|---|
| 10,789,229 | B2 * | 9/2020 | He | G06F 16/285 |
| 10,929,415 | B1 * | 2/2021 | Shcherbakov | G06F 3/04847 |
| 11,398,226 | B1 * | 7/2022 | Wang | G10L 15/1822 |
| 11,487,944 | B1 * | 11/2022 | Yang | G06F 40/295 |
| 11,551,044 | B2 * | 1/2023 | Monaghan | G06N 20/00 |
| 11,842,738 | B1 * | 12/2023 | Yan | G06N 3/084 |
| 2002/0196679 | A1 * | 12/2002 | Lavi | G06F 40/30 |
| | | | | 365/200 |
| 2013/0060825 | A1 * | 3/2013 | Farcasiu | G06F 16/25 |
| | | | | 707/812 |
| 2013/0322765 | A1 * | 12/2013 | Neumann | G06V 20/46 |
| | | | | 382/197 |
| 2015/0199333 | A1 * | 7/2015 | Nekhay | G06F 40/30 |
| | | | | 704/9 |
| 2016/0098398 | A1 * | 4/2016 | Bufe | G06F 16/93 |
| | | | | 707/741 |
| 2017/0278514 | A1 * | 9/2017 | Mathias | G06F 16/35 |
| 2018/0247221 | A1 * | 8/2018 | Park | G06F 40/20 |
| 2019/0129732 | A1 * | 5/2019 | Sivertson | G06N 7/01 |
| 2019/0213484 | A1 * | 7/2019 | Winn | G06N 5/022 |
| 2019/0236148 | A1 * | 8/2019 | DeFelice | G06N 3/047 |
| 2019/0392078 | A1 * | 12/2019 | Methani | G06F 16/3347 |
| 2020/0057612 | A1 * | 2/2020 | Doyle | G06F 8/35 |
| 2021/0027206 | A1 * | 1/2021 | Monaghan | G06N 20/20 |
| 2021/0182659 | A1 * | 6/2021 | Makhija | G06F 16/212 |
| 2021/0216847 | A1 * | 7/2021 | Ramani | G06Q 10/087 |
| 2021/0279525 | A1 * | 9/2021 | Goyal | G06V 10/776 |
| 2021/0295822 | A1 * | 9/2021 | Tomkins | G06F 16/3338 |
| 2022/0035799 | A1 * | 2/2022 | Bhutada | G06F 40/30 |
| 2022/0058504 | A1 * | 2/2022 | Malhotra | G06N 20/20 |
| 2022/0129766 | A1 * | 4/2022 | Potts | G16H 70/60 |
| 2022/0229991 | A1 * | 7/2022 | Duong | G06F 40/279 |
| 2022/0292684 | A1 * | 9/2022 | Wang | G06N 3/0455 |
| 2022/0382984 | A1 * | 12/2022 | Gelli | G06N 5/022 |
| 2023/0061731 | A1 * | 3/2023 | Sengupta | G06N 3/045 |
| 2023/0127652 | A1 * | 4/2023 | Pouran Ben Veyseh | |
| | | | | G06N 3/0895 |
| | | | | 704/9 |
| 2023/0237399 | A1 * | 7/2023 | Hoang | G06N 3/045 |
| | | | | 704/9 |

OTHER PUBLICATIONS

Ding et al., "Few-Nerd: A Few-shot Named Entity Recognition Dataset", Proceedings of the 59th Annual Meeting of the Association for Computational Linguistics and the 11th International Joint Conference on Natural Language Processing, Aug. 2021, 16 pages.
Ju et al., "A Neural Layered Model for Nested Named Entity Recognition", Available Online at: https://aclanthology.org/N18-1131.pdf, Proceedings of the 2018 Conference of the North American Chapter of the Association for Computational Linguistics: Human Language Technologies, vol. 1, Jun. 2018, pp. 1446-1459.
Lin et al., "A Closer Look at Loss Weighting in Multitask Learning", Available Online at: https://arxiv.org/pdf/2111.10603.pdf, Nov. 20, 2021, pp. 1-22.
Liu et al., "End-to-End Multi-Task Learning with Attention", Available Online at: https://arxiv.org/pdf/1803.10704.pdf, Apr. 5, 2019, 10 pages.
Waldis et al., "Nested and Balanced Entity Recognition Using Multi-Task Learning", Available Online at: https://arxiv.org/pdf/2106.06216.pdf, Jun. 11, 2021, pp. 1-10.

* cited by examiner

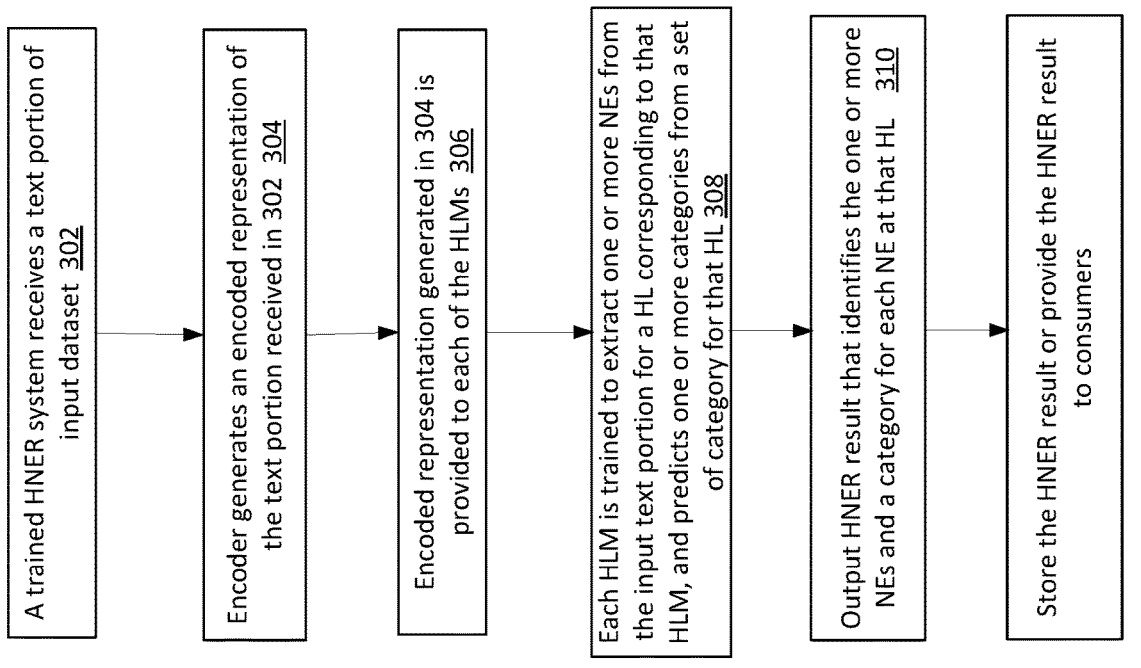

A trained HNER system receives a text portion of input dataset 302

Encoder generates an encoded representation of the text portion received in 302 304

Encoded representation generated in 304 is provided to each of the HLMs 306

Each HLM is trained to extract one or more NEs from the input text portion for a HL corresponding to that HLM, and predicts one or more categories from a set of category for that HL 308

Output HNER result that identifies the one or more NEs and a category for each NE at that HL 310

Store the HNER result or provide the HNER result to consumers

HIERARCHICAL NAMED ENTITY RECOGNITION WITH MULTI-TASK SETUP

CROSS-REFERENCES TO RELATED APPLICATIONS

This application is a non-provisional of and claims the benefit of U.S. Provisional Application No. 63/351,700, filed on Jun. 13, 2022, which is incorporated herein by reference in its entirety for all purposes.

FIELD OF THE INVENTION

The present disclosure generally relates to named entity recognition ("NER") processing. More specifically, a novel system is described for performing hierarchical named entity recognition ("HNER") processing that includes identifying one or more named entities and associated categories at different hierarchical levels.

BACKGROUND

NER is quite extensively used in applications that are tasked with understanding the meaning of language text. For example, NER is commonly used in natural language processing applications to identify entities in natural language text. An entity could be a word or a string of words. Given text input, which could be one or more words, one or more sentences, one or more paragraphs, etc., NER techniques are used to identify one or more entities from input text and associate a category with each entity. For example, entity "John Doe" may be extracted from a piece of text and tagged or labeled with a "Person" category, entity "New York" may be tagged or labeled with a "Location" category, and the like.

NER processing is commonly used by chatbots and digital assistants to identify named entities from textual or speech/audio utterances provided as inputs to the chatbots or digital assistants. A chatbot is configured to extract entities from the inputs and label them with appropriate category labels from a preconfigured set of categories. Over the past few years, with the advent of Artificial Intelligence (AI) and Machine Learning (ML) techniques, these AI/ML techniques have been used to perform NER processing. AI models are trained to perform NER analysis.

Recently, a concept of hierarchical named entity recognition ("HNER") or Nested NER has emerged to add more contextual information for named entities. In HNER, multiple categories may be associated with an extracted named entity where the tagged categories are hierarchically related to each other. A named entity is thus labeled at multiple levels, each level adding further details about the entity to the previous level label. For example, in the sentence "That person lives in Mumbai, India.", the named entity "Mumbai, India" may be tagged with a "Location" category at hierarchical level 1, and Mumbai may additionally be tagged with a "City" category at hierarchical level 2, where hierarchical level 2 is a sub-category of the hierarchical level 1 category (e.g., Location is a category at hierarchical level 1, and City is a sub-category of Location). There could be multiple levels of such hierarchies with categories at each of the hierarchical levels. Each hierarchical level adds increasing specificity or granularity of categories.

HNER processing thus provides more contextual information than NER processing and is thus more useful in certain applications. While AI/ML techniques have been applied to HNER processing, they suffer from several limitations. These include increased complexity of the models used to perform the HNER analysis, increased training complexity and increased training time, taking a much longer time to perform the HNER analysis, not having the desired level of accuracy, and others.

BRIEF SUMMARY

The present disclosure generally relates to named entity recognition processing. More specifically, a novel system is described for performing hierarchical named entity recognition processing that includes identifying one or more named entities and associated categories at different hierarchical levels. Various embodiments are described herein, including methods, systems, non-transitory computer-readable storage media storing programs, code, or instructions executable by one or more processors, and the like.

The HNER system uses a novel architecture comprising an encoder model and a system of trained machine learning (ML) models to perform the HNER processing, where the system of models includes a trained model corresponding to each hierarchical level (referred to as "hierarchical level models"). A particular hierarchical level model trained for a particular hierarchical level is configured to extract a named entity from input text and predict a category (or a category label) for the named entity corresponding to the particular hierarchical level from a set of multiple categories predefined for that particular hierarchical level. Information indicative of the input text is provided to the multiple hierarchical level models in parallel and the models are trained to perform the HNER processing in parallel and output the categories for the different hierarchical levels. Novel techniques are also described for the training the various models in the HNER system including the encoder model and hierarchical level models in the system of models.

In certain implementations, the HNER system uses a novel architecture comprising an encoder model and a system of trained machine learning ("ML") models to perform the HNER processing, where each model in the system of ML models corresponds to a particular hierarchical level and each hierarchical level model is trained to predict a category for the corresponding hierarchical level. Novel techniques are also described for the training the various models in HNER system including an encoder model and hierarchical level models in the system of models.

In certain embodiments, techniques are provided including a method that comprises, for a text portion provided as input to a hierarchical named entity recognition ("HNER") system comprising a plurality of hierarchical level models corresponding to different hierarchical levels of a hierarchy, the plurality of hierarchical level models including a first hierarchical level model corresponding to a first hierarchical level and a second hierarchical level model corresponding to a second hierarchical level: identifying, using the first hierarchical level model, a first category for the first hierarchical level for a first named entity extracted from the text portion, where the first category is selected from a first plurality of categories that the first hierarchical level model is trained to predict, the first plurality of categories corresponding to the first hierarchical level; and identifying, using the second hierarchical level model, a second category for the second hierarchical level for a second named entity extracted from the text portion, where the second category is selected from a second plurality of categories that the second hierarchical level is trained to predict, the second plurality of categories corresponding to the second hierarchical level; where identifying the first category using the first hierarchical level model is performed independently of identifying the second category using the second hierarchical level model.

In yet another embodiment, the first named entity and the second named entity are the same named entity.

In yet another embodiment, the method further comprises identifying, using the first hierarchical level model, a third category for the first hierarchical level for a third named entity extracted from the text portion. wherein the third category is selected from a third plurality of categories that the first hierarchical level model is trained to predict, the third plurality of categories corresponding to the first hierarchical level.

In yet another embodiment, identifying the first category using the first hierarchical level model is performed in parallel with identifying the second category using the second hierarchical level model.

In yet another embodiment, the method further comprises outputting information indicative of the first named entity, the first category, the second named entity, and the second category.

In yet another embodiment, the method further comprises generating, by an encoder of the HNER system, an encoded representation of the text portion; and providing the encoded representation to both the first hierarchical level model and to the second hierarchical level model in parallel.

In yet another embodiment, the encoder is a Bidirectional Encoder Representations from Transformers ("BERT") model.

In yet another embodiment, the method further comprises training the encoder and the plurality of hierarchical level models using a plurality of training datapoints.

In yet another embodiment, training the plurality of hierarchical level models comprises: training the first hierarchical level model to predict categories in the first plurality of categories corresponding to the first hierarchical level; and training the second hierarchical level model to predict categories in the second plurality of categories corresponding to the second hierarchical level.

In yet another embodiment, training the encoder and the plurality of hierarchical level models comprises: for a first training datapoint in the plurality of training datapoints, providing a text portion of the first training datapoint to the encoder; based upon an annotation information associated with the first training datapoint, identifying, for each hierarchical level in the hierarchy, ground truth information for the hierarchical level, where the ground truth information for the hierarchical level comprises information indicative of a named entity in the text portion of the first training datapoint and a category for the named entity, where the category is one of a plurality of categories corresponding to the hierarchical level; generating by the encoder an encoded representation for the text portion of the first training datapoint; providing the encoded representation for the text portion of the first training datapoint to each hierarchical level in the plurality of hierarchical level models; and generating, by each hierarchical level model in the plurality of hierarchical level models, a prediction for the text portion of the first training datapoint, where the prediction by a hierarchical level model identifies a named entity extracted by the hierarchical level model from the text portion of the first training datapoint for that hierarchical level corresponding to the hierarchical level model and a category predicted by the hierarchical level model for the extracted named entity, where the category predicted by the hierarchical level model is from a plurality of categories for the hierarchical level In yet another embodiment, training the encoder and the plurality of hierarchical level models further comprising: computing, for each hierarchical level in the hierarchy, a hierarchical level loss for the hierarchical level based upon the prediction generated by a hierarchical level model from the plurality of hierarchical level models corresponding to the hierarchical level and the ground truth information for the hierarchical level identified from the annotation information associated with the first training datapoint; generating an aggregate loss based upon the hierarchical level losses computed for the plurality of hierarchical levels; and minimizing the aggregate loss using a loss minimization technique, where the minimizing comprises updating the encoder and the plurality of hierarchical level models.

In yet another embodiment, updating the encoder and the plurality of hierarchical level models comprises updating one or more trainable parameters associated with the encoder and the plurality of hierarchical level models.

In yet another embodiment, the loss minimization technique is cross-entropy loss function.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

FIG. 3 illustrates a process flow for performing HNER processing, according to certain embodiments.

DETAILED DESCRIPTION

Figure 1A:
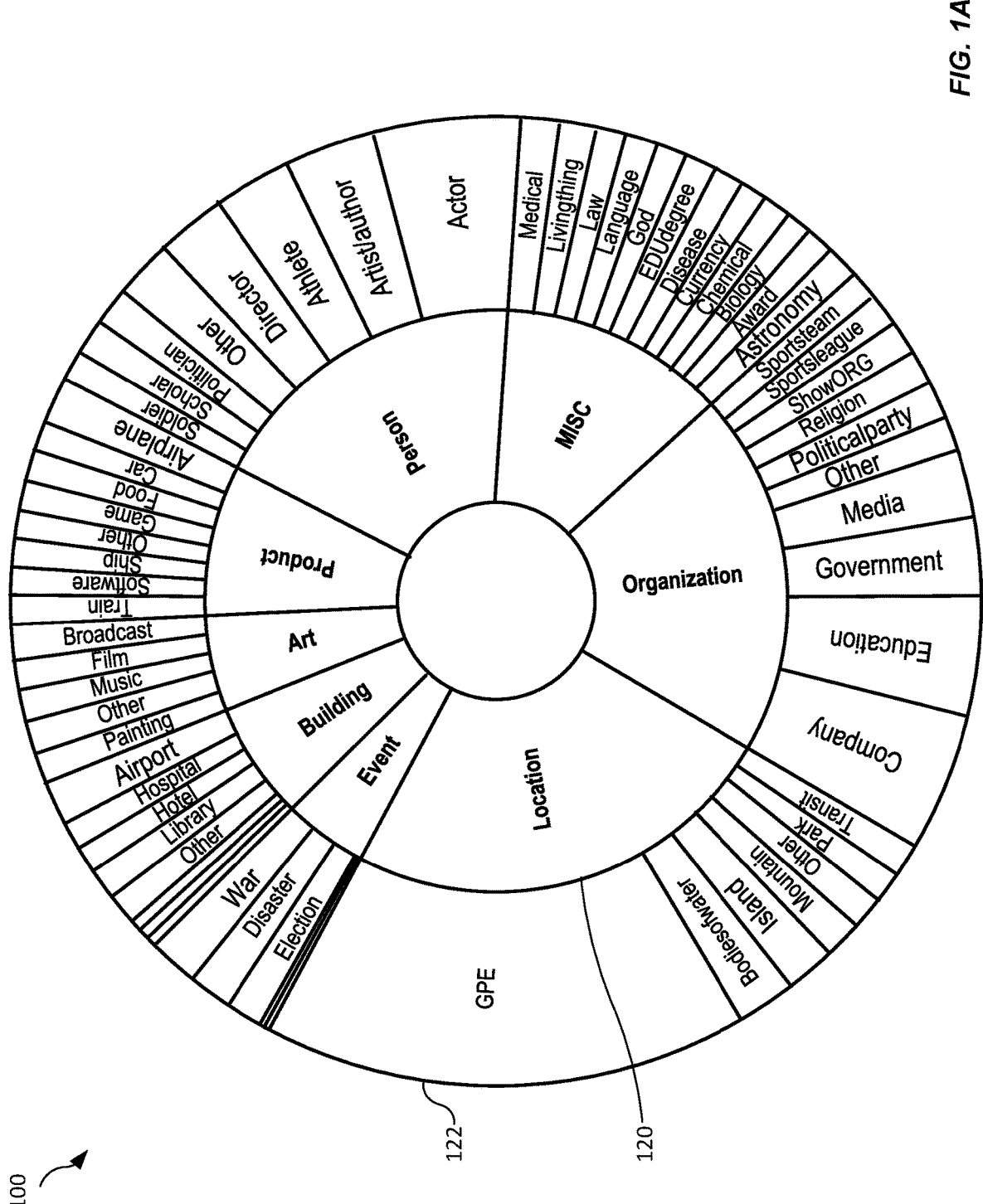
FIG. 1A is a diagram illustrating hierarchical NER data, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure generally relates to named entity recognition ("NER") processing. More specifically, a novel system is described for performing hierarchical named entity recognition ("HNER") processing that includes identifying one or more named entities and associated categories at different hierarchical levels. The HNER system uses a novel architecture comprising an encoder model and a system of trained machine learning (ML) models to perform the HNER processing, where the system of models includes a trained model corresponding to each hierarchical level (referred to as "hierarchical level models"). A particular hierarchical level model trained for a particular hierarchical level is configured to extract a named entity from input text and predict a category (or a category label) for the named entity corresponding to the particular hierarchical level from a set of multiple categories predefined for that particular hierarchical level. Information indicative of the input text is provided to the multiple hierarchical level models in parallel and the models are trained to perform the HNER processing parallel and output the categories for the different hierarchical levels. Novel techniques are also described for the training the various models in HNER system including the encoder model and hierarchical level models in the system of models.

As indicated in above, existing ML-based techniques for performing HNER processing have several limitations, including increased complexity of the models, increased training complexity and training time, taking a much longer time to perform the HNER analysis, not having the desired level of accuracy, and others. According to one existing technique, a deep learning-based model is trained for performing HNER processing, but the model is trained such that it is trained to predict only the most specific level (also referred to as the outermost hierarchical level) of category labels. For example, for categories in the outermost ring shown in FIG. 1A, a separate multi-level label mapping is maintained and used to map the outermost level category label to other inner categories in the hierarchical structure during inference. This technique essentially treats the multi-level hierarchy as a single-level flat hierarchy. As a result, this approach has several technical drawbacks. Due to the flat hierarchy, the trained model is not able to leverage the correlations between the multiple levels of category labels. For example, for a named entity "Mumbai, India" that is tagged with a "Location" category at hierarchical level 1, and additionally with a "City" category at hierarchical level 2, in the case of the flat hierarchy, the model is not able to leverage the correlation between Location and City categories. Furthermore, considering only the most specific level of labels translates to a large number of classes/categories for the task of sequence labeling, and this makes the learning difficult and thus training the model more difficult and the resultant trained model is typically less accurate. Finally, this approach can treat labels in the flat hierarchy as entirely different classes, and lose the benefits of the hierarchy and the hierarchical relationships.

According to another existing technique, the hierarchy is flattened and each unique combination of categories from the lowest hierarchical level to the highest hierarchical level are considered as separate category labels. This results in a large number of category labels for which a single model has to be trained. This again makes training the model a difficult complicated task and results in models that are not as accurate.

As another example, architectures involve stacking flat NER layers, where each layer can include a deep learning network. In the sequential arrangement, the output of a previous layer become input to the next layer, and so one. This significantly increases the prediction time making such architectures very slow for predicting hierarchical categories.

The HNER system described in this present disclosure provides advancements and improvements over existing approaches. The HNER system, described herein, uses a novel architecture comprising an encoder model and a system of trained ML models to perform the HNER processing, where the system of models includes a trained model corresponding to each hierarchical level. These models are referred to as "hierarchical level models" or "HLMs." Each HLM is trained to extract a named entity from information representing text input and to predict a category for the named entity at the hierarchical level corresponding to the HLM.

A single encoder model receives as input a text portion from which one or more named entities are to be extracted and hierarchical categorization for each named entity is to be performed. The encoder model is configured to generate an encoded representation of the input text portion. The encoded representation is then provided as input to each of the HLMs in the system of models. In certain implementations, a Transformer-based encoder model is used as the encoder. An example of such a model is the Bidirectional Encoder Representations from Transformers ("BERT") model. The BERT model can be trained and be configured as a feature extractor and perform context learning.

Each HLM in the system of models is trained to receive as input the encoded representation of the text portion generated by the encoder, to extract a named entity based upon the encoded representation, and to predict a category (also referred to as predicting a category label) from a set of categories (or set of category labels) defined for a hierarchical level corresponding to that HLM. For example, a first HLM may be trained for predicting categories at a first hierarchical level, a second HLM may be trained for predicting categories at a second hierarchical level, and so on. Accordingly, if there are "N" hierarchical levels, then "N" HLMs are provided, each trained for a specific hierarchical level.

In certain implementations, the HLMs are lightweight neural network models. The encoded output of the encoder is provided to the HLMs in parallel, and each HLM is trained to make its named entity extraction and category prediction in parallel with other HLMs. Each HLM is trained to make its named entity extraction and category prediction independent of other HLMs in the system of models. This parallel architecture and independence provide several technical benefits. Due to this independence, the various HLMs can make their predictions in parallel and do not have to wait upon the outputs of other HLMs. The prediction of categories for the different hierarchical levels is thus parallelized. The categories predicted by the different HLMs in the system of models in parallel can then be easily aggregated and output as the HNER result (i.e., information for the input text portion). This makes the overall HNER processing faster compared to existing approaches discussed above.

User of the HNER system have flexibility as to how the output of the system is consumed. Users can consume the category predictions at the various hierarchical levels, at only some selected hierarchical levels (e.g., only the coarser predictions, or only the more specific predictions), or other combinations and the like.

The parallel architecture and the independence of the level models, or alternatively, the lack of interdependence between the HLMs, makes the HNER system scalable and flexible. An existing HNER system can be easily changed to add or remove hierarchical levels, and/or change categories at a hierarchical level. New hierarchical levels and associated HNER ground truth can be easily introduced by adding new HLMs for the levels being added, and retraining the HNER system with corresponding new data for the newly added HLMs. Likewise, an existing level can be removed by removing the HLM corresponding to that level from the system of models. Changes can also be made to a particular hierarchical level, such as changes to the categories for that level, by changing and retraining the HLM for that level. That makes HNER system flexible and reconfigurable.

A novel training technique is used for training various models in the HNER system including the encoder model and the hierarchical level models ("HLMs") in the system of models. The training dataset used for the training includes multiple training datapoints, where each training datapoint includes a text portion and associated annotation information, where the annotation information includes the HNER ground truth for the text portion. For a particular text portion, the associated annotation or HNER ground truth information identifies one or more named entities for the text portion at the different hierarchical levels, and the corresponding categorization (i.e., category label) for each named entity at each hierarchical level. While in the examples described below one named entity is extracted at each hierarchical level, this is not restricted. Multiple named entities may be extracted at each hierarchical level.

In certain implementations, as part of the training phase, a training loss is computed for each HLM being trained and the losses are then aggregated and minimized. An aggregated training loss is computed for the entire system including the encoder and the system of models based upon the training losses computed for each of the HLMs. Loss minimization techniques are used for minimizing the aggregate loss computed for the entire system, and this results in trainable parameters (e.g., weights of a neural network) of the HLMs in the system of models and of the encoder model to be updated with each training epoch to improve the performance and accuracy of these models with each training epoch. By optimizing the HNER system based upon the aggregate loss for the overall system, the correlation between the categories at the different hierarchical levels is trained into the system. The HNER system thus leverages the hierarchical structure of the categories. This makes the HNER system more robust and accurate. In certain implementations, hyperparameters associated with the training environment are also tuned as part of the training phase.

For the purpose of this application, as per HNER processing, named entity extraction and category or category label prediction is done for each hierarchical level (or hierarchical layer) of a hierarchy. A set of categories is defined for each hierarchical level. A category at one hierarchical level has some contextual relationship (or hierarchical relationship) with the next hierarchical level, but with different scopes, for example, an organization at hierarchical level 1 and a company at hierarchical level 2. In certain implementations, the scope of the categories become more specific with increasing levels of the hierarchy. According, hierarchical level 1 represent categories, hierarchical level 2 represents sub-categories, hierarchical level 3 represents sub-sub categories, and so on. The specificity or granularity of the categories increases with increasing hierarchical levels. On the other hand, the coarseness of the categories increases with decreasing hierarchical levels.

In certain implementations, the functionalities provided by a HNER system, as describe in this disclosure, may be provided as cloud services by a cloud services provider (CSP) to subscribing customers. In one such embodiment, a customer subscribing to the services may provide the text portions, for which named entity extraction and categorization is to be performed, to the service. The service may then perform named entity extraction and categorization and provide the results back to the requesting customer.

A hierarchy and its hierarchical levels may be pictorially represented using various visual forms such as a pie chart, a tree, a tiered structure, or other forms.

FIG. 1A is a diagram illustrating hierarchical NER data for a hierarchy being represented as a pie chart 100, according to certain embodiments. In FIG. 1A, the hierarchical NER data (or HNER data) has two hierarchical levels, each hierarchical level being represented by a ring or layer in pie-chart 100. Ring/Layer 120 represents hierarchical level 1 and ring/layer 122 represents hierarchical level 2. In the embodiment depicted in FIG. 1A, the categories at hierarchical level 2 are more specific or granular than the categories at hierarchical level 1. In pie-chart 100, the relationship between inner-layer 120 and outer-layer 122 is like a genus-species relationship. In pie-chart 100, there are 8 categories at level 1 (e.g., inner-layer). The categories at hierarchical level 1 are "Location," "Event," "Building," "Art," "Product," "Person," "Organization," and "Miscellaneous." In pie-chart 100, there are 66 sub-categories that are hierarchically related to categories at hierarchical level 1. For example, the "Person" category at level 1 is hierarchically a genus of eight sub-categories at hierarchical level 2, namely, "Soldier," "Scholar," "Politician," "Other," "Director," "Athlete," "Artist/Author," and "Actor." The outermost layer comprises the specific or granular categories and the inner layer comprises the coarser categories. Based on the relationship between layers (or levels), the inner-most layer (e.g., level 1) has the fewest number of categories. Each successive layer has an increasing number of categories. For purposes of describing the categories at the different hierarchical levels, a category at hierarchical level 1 is referred to as a category, a category at hierarchical level 2 is referred to as a sub-category (since it is a sub-category of some category at hierarchical level 1), a category at hierarchical level 3 is referred to as a sub-sub category (since it is a sub category of some sub-category at hierarchical level 2), a category at hierarchical level 4 is referred to as a sub-sub-sub category (since it is a sub category of some sub-sub-category at hierarchical level 3), and so on.

In a HNER system that implements the hierarchy structure depicted in FIG. 1A, a first HLM is trained for hierarchical level 1 and a second HLM is trained for hierarchical level 2. The first HLM is trained to predict a category from the set of categories including "Location," "Event," "Building," "Art," "Product," "Person," "Organization," and "Miscellaneous." The second HLM is trained to predict a category from the set of categories in layer 2 including "Soldier," "Scholar," "Politician," "Other," "Director," "Athlete," "Artist/Author," "Actor," "Company," "Education," etc.

Figure 1B:
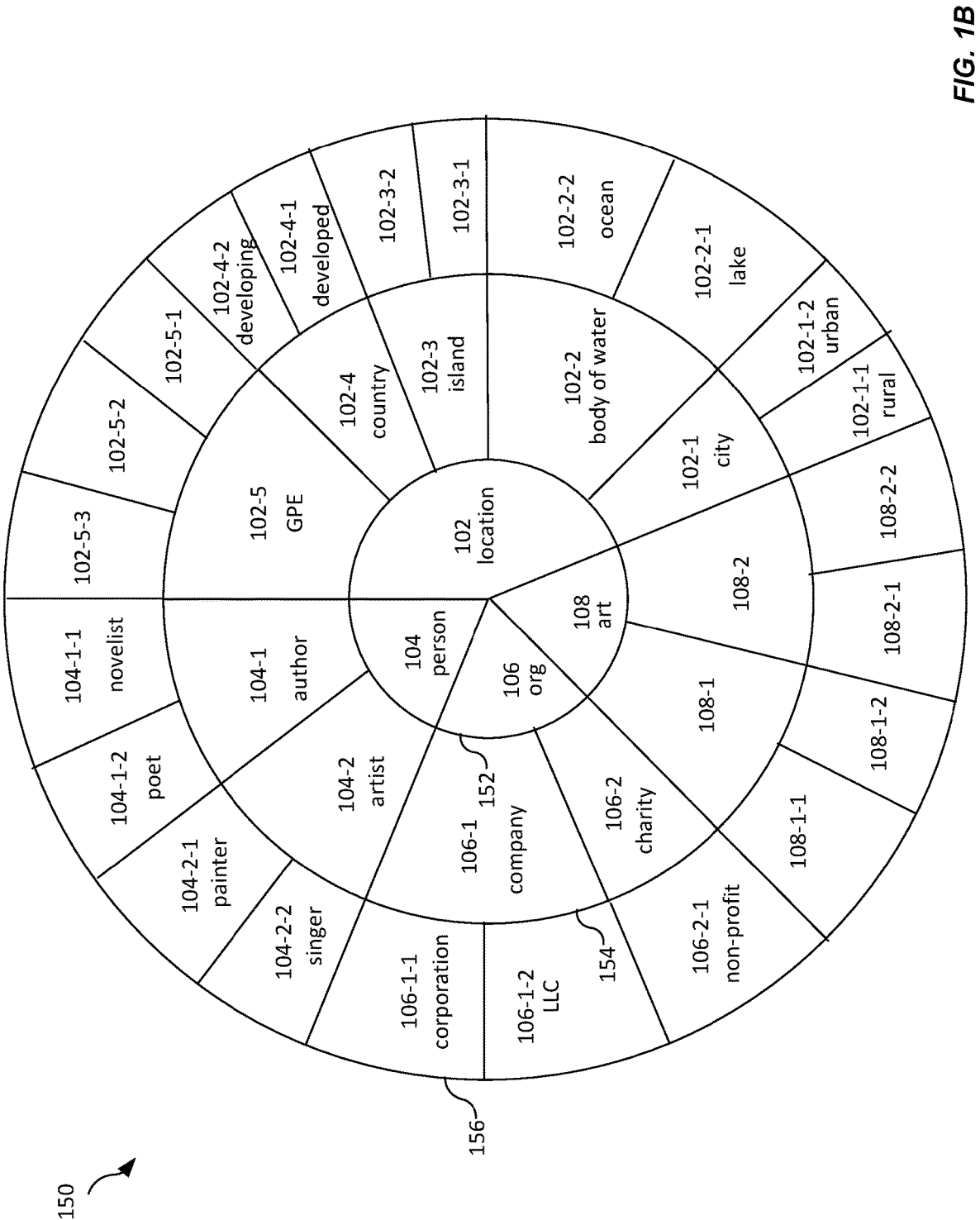
FIG. 1B is a simplified diagram illustrating hierarchical NER data, according to certain embodiments

FIG. 1B depicts another pie chart 150 illustrating HNER data for a hierarchy, according to certain embodiments. In FIG. 1B, the hierarchy represented by the HNER data has three levels of hierarchy, and is represented by three concentric layers/rings in pie-chart 150. The inner-most layer 152 represents hierarchical level 1 and comprises four categories, namely, 102 (location), 104 (person), 106 (organization), and 108 (art). The middle layer 154 represents hierarchical level 2 and comprises eleven categories which are sub-categories of categories at hierarchical level 1. The outermost layer 156 represents hierarchical level 3 and comprises twenty-two categories which are sub-categories of categories at hierarchical level 2 (thus, sub-sub categories of the sub categories at hierarchical level 2).

For example, category 102 (location) at hierarchical level 1 has five sub-categories at level 2, namely, 102-1 (city), 102-2 (body of water), 102-3 (island), 102-4 (country), and 102-5 (geo political entity or GPE). Body of water 102-2 at hierarchical level 2 further has two specific categories at hierarchical level 3, namely 102-2-1 (lake) and 102-2-2 (ocean). As another example, category 104 (person) at hierarchical level 1 has two sub-categories at level 2, namely, 104-1 (author) and 104-2 (artist). Author 104-1 at hierarchical level 2 further has two specific categories at hierarchical level 3, namely 104-1-1 (novelist) and 104-1-2 (poet).

In a scenario where a hierarchical level contains only one sub-category, the HNER data becomes a single hierarchy, and thus a single HLM may be used for that hierarchy. For example, category 106 (organization) at hierarchical level 1 has two sub-categories at hierarchical level 2, namely, 106-1 (company) and 106-2 (charity). "Charity" 106-2 at hierarchical level 2 has only one sub-category at hierarchical level 3 (i.e., sub-sub-category of categories at level 1), namely 106-2-1 (non-profit). In such a case, category 106-2 (charity) and its sub-category 106-2-1 (non-profit) may become synonymous, and be treated as a single hierarchical level 2. As a result, a first HLM is trained for hierarchical level 1, and a second HLM is trained for hierarchical level 2 to predict either category "charity" or "non-profit" depending on configurations.

In some embodiments, the text portion of HNER data input may be a word, a phrase, a sentence, or multiple sentences. As an example, in one embodiment, a text portion of HNER data input may be a word "Shakespeare." It can be categorized at level 1 as 104 (person), at level 2 as sub-category 104-1 (author), and at level 3 as sub-sub-category 104-1-2 (poet). As another example, the text portion input can be a sentence like "Hawaii is in the Pacific Ocean." Both "Hawaii" and the "Pacific Ocean" can be extracted as named entities at level 1, and each categorized as 102 (location) at hierarchical level 1. Based upon the HNER processing performed by the HNER system disclosed in the present disclosure, categories at additional hierarchical levels are predicted. For example, the system is further able to categorize named entity "Hawaii" at level 2 as sub-category 102-3 (island) and named entity "Pacific Ocean" at level 2 as sub-category 102-2 (body of water), where 102-3 (island) and 102-2 (body of water) are hierarchical sub categories of category 102 (location).

Yet, in another example, the text portion of HNER data input can be a sentence like "Bob Marley was born in Nine Miles, Jamaica." The HNER processing performed by the HNER system disclosed in the present disclosure can categorize named entity "Bob Marley" at level 1 as 104 (person), at level 2 as sub-category 104-2 (artist), and at level 3 as sub-sub-category 104-2-2 (singer). The HNER system can further categorize name entity "Nine Miles" at level 1 as category 102 (location), at level 2 as sub-category 102-1 (city), and at level 3 as sub-sub-category 102-1-1 (rural). Finally, the HNER system can categorize name entity "Jamaica" at level 1 as category 102 (location), at level 2 as sub-category 102-4 (country), and at level 3 as sub-sub-category 102-4-2 (developing).

Figure 2:
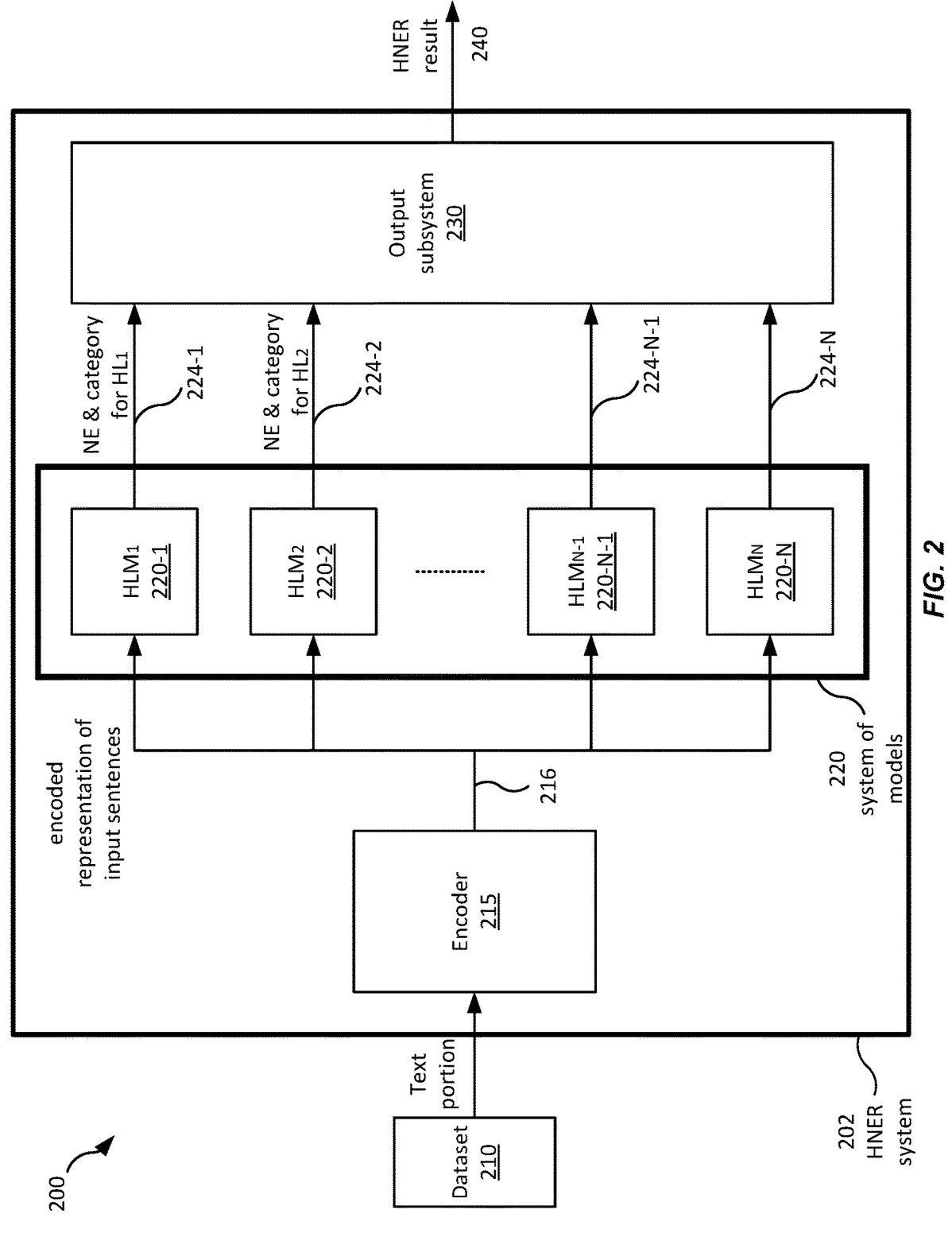
FIG. 2 is a simplified block diagram illustrating a trained HNER system, according to certain embodiments.
Figure 10:
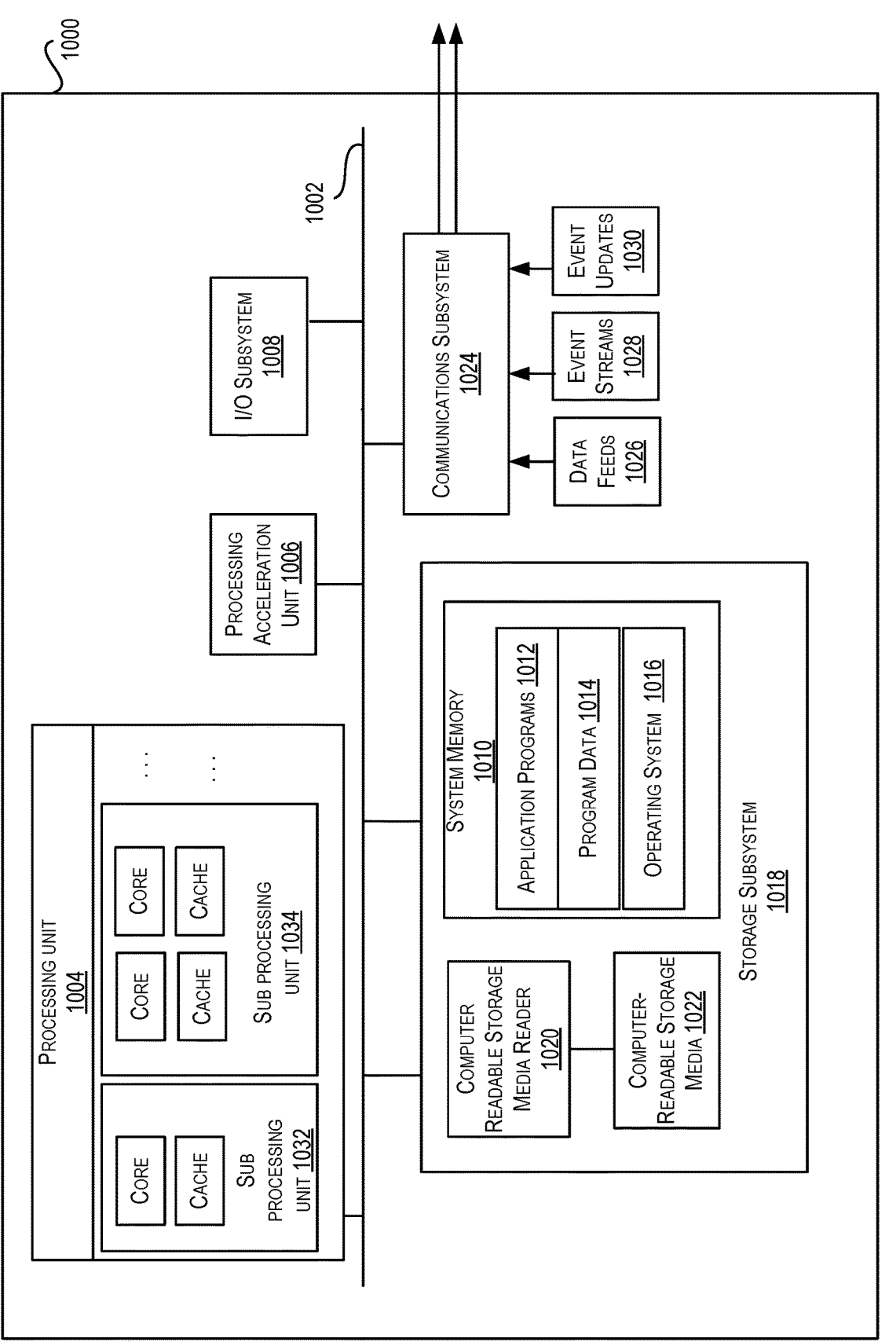
FIG. 10 is a block diagram illustrating an example computer system, according to at least one embodiment.

FIG. 2 is a simplified block diagram illustrating a trained HNER system 200, according to certain embodiments. HNER system 200 may be implemented by one or more computing systems that execute computer-readable instructions (e.g., code, program) to implement the various functions performed by the HNER system. An example of a computing system that may be used to implement HNER system 200 is depicted in FIG. 10 and described below. In the embodiment illustrated in FIG. 2, the HNER system 200 includes various components including an encoder 215, a system of trained machine learning (ML) 220 comprising HLMs 220-1, 220-2, . . . 220-N, and an output subsystem 230. The HNER system depicted in FIG. 2, including its subsystems, may be implemented using software (e.g., code, instructions, program) executed by one or more processing units (e.g., processors, cores) of a computing system, hardware, or combinations thereof. The software may be stored on a non-transitory storage medium (e.g., on a memory device). The HNER system depicted in FIG. 2 is merely an example and is not intended to unduly limit the scope of claimed embodiments. One of ordinary skill in the art would recognize many possible variations, alternatives, and modifications. For example, in some implementations, the HNER system may have more or fewer sub-systems or components than those shown in FIG. 2, may combine two or more systems, or may have a different configuration or arrangement of components.

Figure 4:
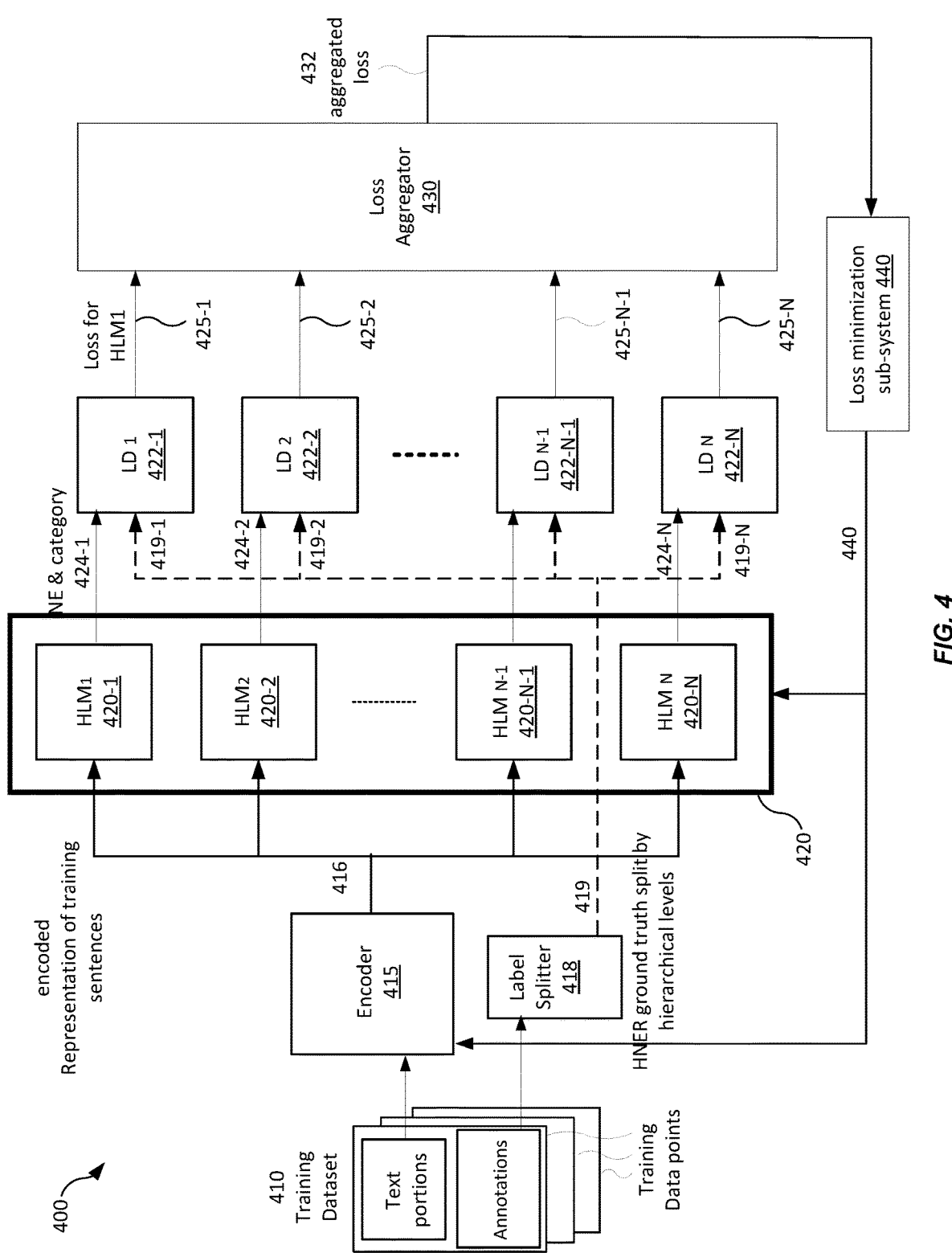
FIG. 4 is a simplified block diagram illustrating a training environment 400 for training the various models of a HNER system, according to certain embodiments.

A system that includes one or more AI/ML models is trained during a training phase during which the AI models are trained using training data. Training continues until the performance of the system becomes acceptable (e.g., prediction results exceed some desired accuracy levels). Once acceptable, the trained system can then be used for real-time inferencing on real data. In certain implementations, feedback received from the inferencing phase can be used to retrain the system to further improve its performance. It is assumed that HNER system 200 depicted in FIG. 2 and described below has already been trained and is ready to perform real-time inferencing. The innovative training used to train the system is depicted in FIG. 4 and described below.

In FIG. 1, dataset 210 represents a set of one or more text portions that may be provided as input to HNER system 200 for categorization. The text portions can be of different types such as a word, a sequence of words, a sentence, a sentence fragment, multiple sentences, a paragraph, multiple paragraphs, and the like. The input to HNER system 200 can be of variable length. In some use cases, such as in chatbot applications, the text portions in data set 210 can include text utterances or transcriptions of audio utterances. For example, an audio may be converted to text using a speech-to-text converter that also inserts punctuation marks into the resulting text, e.g., commas, semicolons, periods, etc. In some embodiments, where the functionalities provided by HNER system 200 are provided as a cloud service by a CSP, dataset 210 may represent one or more text portions provided by a subscribing customer.

As shown in FIG. 2, a text portion from dataset 210 is provided as input to HNER system 200. Encoder 215 receives this text portion as input and generates an encoded representation 216 representative of the input text portion. The encoder 215 is responsible for extracting features from the input, where the extracted features are useful for subsequent named entity extraction and categorization at different hierarchical levels performed by system of models 220. The encoded representation encapsulates the extracted features.

The encoded representation 216 may be in various formats, including but not limited to binary, numeric, text, categorical, and other formats. In some embodiments, the encoder 215 takes a variable length input and generates a vector that encapsulates information about the input (e.g., features extracted from the input) to help the systems of models 220 to perform named entity extraction from the text portion at different hierarchical levels and categorizations at different hierarchical levels.

Encoder 215 can be implemented in different ways. In some embodiments, the encoder 215 is implemented using a deep learning neural network. In some embodiments, encoder 215 can comprise a transformer-based network (e.g., Bidirectional Encoder Representations from Transformers ("BERT") model) that acts as a feature extractor and performs context learning.

System of ML models 220 comprises multiple trained ML models including a trained model corresponding to each hierarchical level. As previously indicted, these models are referred to herein as "hierarchical level models" or "HLMs." The encoded representation 216 generated by the encoder 215 is provided to each of the HLMs. For example, the encoded representation 216 may be provided in parallel to all the HLMs in system of model 220.

In certain implementations, each HLM in system of model 220 corresponds to a particular hierarchical level from the different hierarchical levels and is trained to perform named entity extraction and predict a category for that particular hierarchical level. The number of HLMs thus equals the number of hierarchical levels. The mapping between an HLM and a hierarchical level is a one-to-one mapping (i.e., no two HLM models may handle the same hierarchical level). For instance, if a hierarchy comprises three levels (e.g., hierarchy 150 depicted in FIG. 1B), the HNER system configured for that hierarchy includes a system of models 220 that includes three HLMs, one specific to each hierarchical level. In the embodiment depicted in FIG. 2, system of models 220 comprises "N" HLMs (HLM1 220-1, HLM2 220-2, . . . , HLM$_N$ 220-N). For example, HLM1 220-1 may perform named entity extraction from the text input and predict a category from the multiple categories configured for hierarchical level 1 of the hierarchy; HLM2 may perform named entity extraction from the text input and predict a category from the multiple categories configured for hierarchical level 2 of the hierarchy; HLM3 220-3 may perform named entity extraction from the text input and predict a category from the multiple categories configured for hierarchical level 3 of the hierarchy; and so on.

In some embodiments, each HLM (220-1 to 220-N) performs the task of analyzing the received encoded representation 216 and predicting a category for the named entity independently from the processing performed by other HLMs. Independently means that each HLM can performs its processing of the encoded representation 216 without regard to processing performed by any other HLMs, or the inputs provided to the other HLMs, or the outputs generated by the other HLMs. In other words, an HLM (220-1 to 220-N) has no influence on processing performed by another HLM (220-1 to 220-N). Due to this independence (or lack of interdependence) and because the HLMs receive the encoded representation 216 from the encoder 215 in parallel, the processing performed by the HLMs may be performed in parallel. Performing processing in parallel means that the HLMs process the encoded representation simultaneously or at the same time. In certain embodiments, the outputs from the HLMs may be generated in parallel or substantially in parallel.

The mechanism of using a system of ML models to perform different named entity extraction and categorization tasks for the different hierarchical levels independently and in parallel may also referred to as multi-task setup because the analysis for each hierarchical level is considered a separate task.

The trained system of ML models 220 is trained to output one or more named entities and their associated categories (224-1 to 224-N) at each of the hierarchical levels. Each trained HLM corresponding to a particular hierarchical level extracts a named entity ("NE") and predicts a category corresponding to the particular hierarchical level, where the predicted category is selected from a set of multiple categories corresponding to the particular hierarchical level. For example, HLM1 220-1 may perform named entity extraction and predict a category from the multiple categories configured for hierarchical level 1 of the hierarchy; HLM2 may perform named entity extraction and predict a category from the multiple categories configured for hierarchical level 2 of the hierarchy; HLM3 220-3 may perform named entity extraction and predict a category from the multiple categories configured for hierarchical level 3 of the hierarchy; and so on.

For example, if HNER system 200 is trained for the 2-level hierarchy depicted in FIG. 1A, the system of models 220 includes two trained HLMs, a HLM1 for predicting a category for hierarchical level 1, and a HLM2 for predicting a category for hierarchical level 2. For an input phrase "Bob Marley," the trained HLM1 can extract a named entity "Bob Marley" and predict a category "person" for hierarchical level 1. The trained HLM2 can extract named entity "Bob Marley" and predict category "artist" for hierarchical level 2.

In another embodiment, the input text portion may be such that it includes multiple named entities at the same hierarchical level. For example, consider an input sentence "Bob Marley was born in Nine Miles, Jamaica." For hierarchical level 1, the trained HLM1 can (1) extract a first named entity "Bob Marley" and predict a category "person", and (2) extract a second named entity "Nine Miles" and predict category "location," and (3) extract a third named entity "Jamaica" and predict category "location.". Furthermore, for hierarchical level 2, the trained HLM2 can (1) extract named entity "Bob Marley" and predict category "artist", (2) extract a second named entity "Nine Miles" and predict category "city", and (3) extract a third named entity "Jamaica" and predict category "country".

As shown in FIG. 2, each HLM outputs a named entity (or multiple) and its associated category for the hierarchical level corresponding to the HLM. These outputs (e.g., 224-1, 224-2, 224-3, . . . , 224-N) are provided to output subsystem 230. In certain implementations, each HLM of the system of models 220 may output the extracted named entities and categories 224 in parallel to the output subsystem 230, either simultaneously or in a certain sequence desired by the output subsystem 230. In the embodiment depicted in FIG. 2, the HLMs do not output to other HLMs 220.

There are different ways in which the HLMs may be implemented. In some embodiments, one or more of the HLMs 220 are lightweight, task-specific neural network models. A lightweight network model may refer to a neural network model that may have a small number of layers. For example, a lightweight neural network model may have around 100,000 parameters (or weight factors) and a small number of hidden layers or small number of neurons, for example, 3 to 4 layers, and thus is computationally lightweight. On the other hand, a heavyweight (or dense) neural network model typically refers to a neural network model that may have millions of parameters, such as the BERT model that has around 3 million parameters, and a large number of hidden layers (or neurons), for example, more than 10 layers. The higher the number of parameters a model has, the more network layers and computationally intensive the model has, but it will learn more features more specifically. Thus, lightweight and heavyweight are just comparative terms.

The output subsystem 230 receives the named entities and categories (224-1 to 224-N) generated by the HLMs 220, and performs post-processing to create a hierarchical NER result 240, which represents the result of the HNER processing performed by the HNER system 200. The result 240 includes, for each hierarchical level, information identifying one or more named entities extracted from the input text portion by the HLM for that level and, for each named entity, information identifying a category predicted by the HLM model for that level. The result 240 may be provided to one or more downstream consumers of the result in an output format that can be consumed by the downstream consumer.

In some embodiments, the result 240 may be in the same form that includes the input text portion with annotations indicative of the extracted entities and the associated categories at different hierarchical levels. For example, for an input text portion "Hawaii is in the Pacific Ocean," the HNER processing results may look like "Hawaii (location/ island) is in the Pacific Ocean (location/body of water)," where the categories at the different hierarchical levels (e.g., "location/island" and "location/body") are identified in parenthesis next to the corresponding identified name entities (e.g., Hawaii and the Pacific Ocean, respectively).

Yet, in another embodiment, the result output may be in the form of a visualization such as a pie chart. In such an embodiment, the named entities identified by the HNER system may be placed or super-imposed on top of the predicted categories inside the pie chart (e.g., FIG. 1A). Yet, in an alternative embodiment, the HNER system may be configured to output certain selected hierarchical levels, for example, only the coarser predictions or only the more specific predictions, and the like.

FIG. 3 illustrates a process flow 300 for performing HNER processing, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIG. 2, the processing depicted in FIG. 3 may be performed by one or more components of the HNER system 200, such as by encoder 215 or HLM models 220.

At 302, a trained HNER system (e.g., HNER system 200) receives a text portion for which HNER processing is to be performed. The input text portion may be part of dataset 210 depicted in FIG. 2. The text portion input may be a word, a sequence of words, a phrase, a sentence, multiple sentences, a paragraph, multiple paragraphs, and the like.

At 304, the input text portion is encoded by the HNER system to generate an encoded representation of the text portion received in 302. As described above the encoded representation includes features extracted from the input text portion, where the extracted features are useful for HNER processing.

At 306, the encoded representation generated in 306 is provided to each of the HLMs of the system of models. For example, the encoded representation is provided to each of the HLMs 220 depicted in FIG. 2. In certain implementations, the encoded representation may be provided to the HLMs in parallel. In the embodiment depicted in FIG. 2, the processing in 304 and 306 may be performed by encoder 215.

At 308, each trained HLM of the system of models performs HNER processing for the hierarchical level corresponding to the HLM, where the HNER processing is performed independent of HNER processing performed by the other HLMs, and where HNER processing includes extracting one or more named entities from the input text portion, and for each extracted named entity, predicting a category (or category label) from the set of multiple categories predefined for that hierarchical level.

In certain embodiments, the HNER processing performed by the HLMs in 308 may be performed in parallel.

At 310, a result for the HNER processing is generated, where the result includes, for each hierarchical level, information identifying one or more named entities extracted from the text portion for that hierarchical level, and, for each extracted named entity, a category predicted for that named entity at that level. In certain implementations, the named entities and associated categories for the different hierarchical levels output by the HLMs in 308 is aggregated to form the result in 310. For example, in the embodiment depicted in FIG. 2, output subsystem 230 receives the outputs (named entities and associated predicted categories for the various hierarchical levels) from the different HMLs in the system of ML models 220, and these outputs are aggregated to form the HNER processing result in 310.

At 312, the result generated in 310 may be stored in a memory, may be output via an output device (e.g., via a display of a computer system), or may be provided to a consumer of the result in a format that can be consumed by that consumer. For example, the result may be communicated to a user via email, text message, etc.

Figure 5:
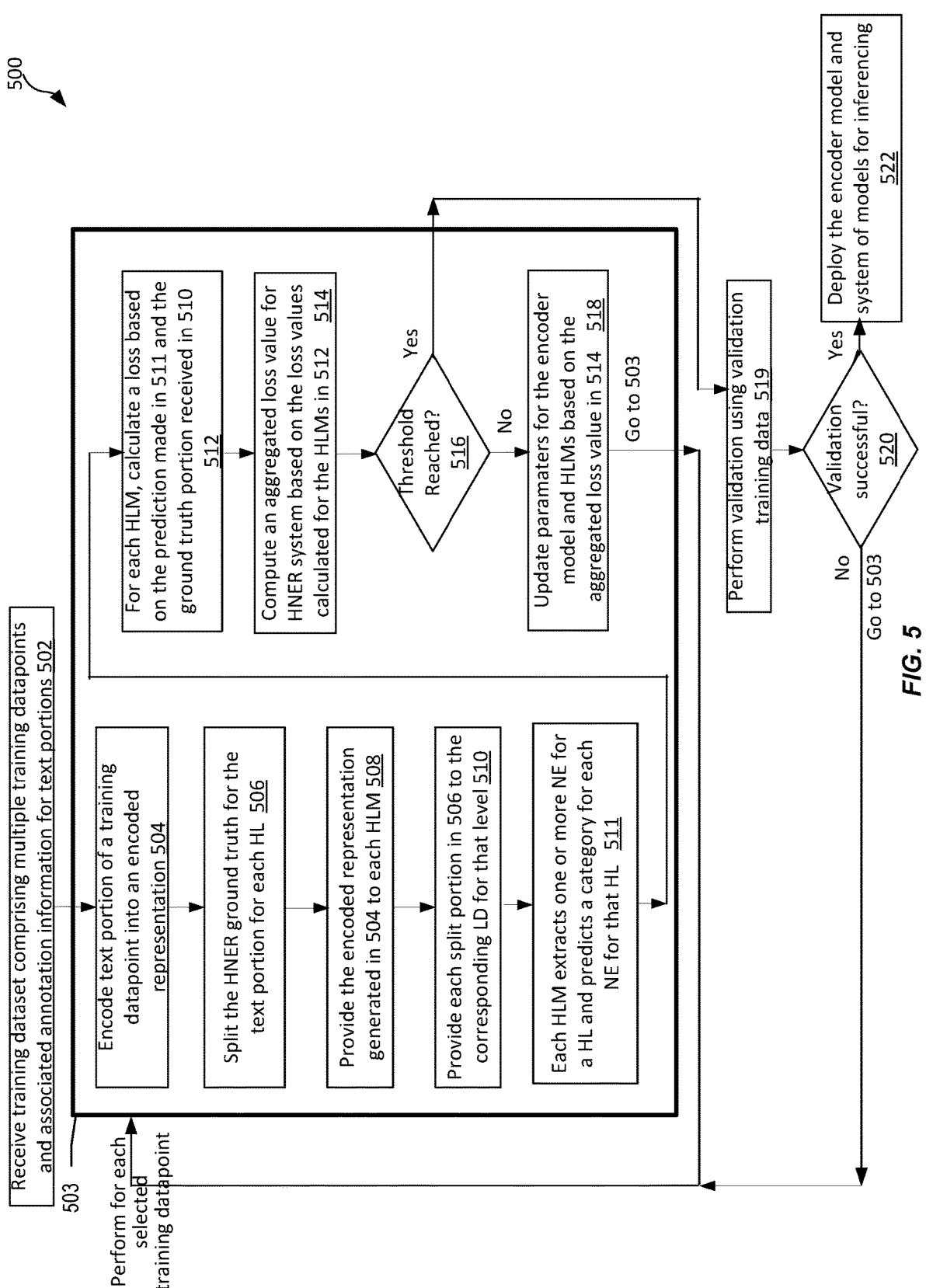
FIG. 5 illustrates a process flow for training a HNER system, according to certain embodiments.

The system depicted in FIG. 2 and the flowchart depicted in FIG. 3 and the associated description assumed that the HNER system has already been trained. As depicted in FIGS. 4 and 5 and the associated description below, novel techniques are described for training a HNER system.

FIG. 4 is a simplified block diagram illustrating a training environment 400 for training the various models of a HNER system including the encoder model and the HLMs, according to certain embodiments. The various components depicted in FIG. 4 may be implemented by one or more computing systems that execute computer-readable instructions (e.g., code, program). As shown in FIG. 4, the various models that are included in a HNER system include encoder 415 and a system for models 420 that includes HLMs 420-1 to 420-N. The training environment 400 is provided for training encoder 415 and the HLMs 420. The components used to train the encoder and HLMs include a label splitter 418, a set of loss determiners ("LDs", 422-1 to 422-N), a loss aggregator 430, and a loss minimization sub-system 440. The various components and subsystems depicted in FIG. 4 may be implemented using software (e.g., code, instructions, program) executed by one or more processing units (e.g., processors, cores) of a computing system, hardware, or combinations thereof. The software may be stored on a non-transitory storage medium (e.g., on a memory device). The environment depicted in FIG. 4 is merely an example and is not intended to unduly limit the scope of claimed embodiments. One of ordinary skill in the art would recognize many possible variations, alternatives, and modifications. For example, in some implementations, the training environment may have more or fewer sub-systems or components than those shown in FIG. 4, may combine two or more systems, or may have a different configuration or arrangement of components.

The training is performed iteratively using training dataset 410. After each iteration, the trainable parameters associated with the models being trained (e.g., the encoder and the HLMs) are updated to minimize the losses, as described below. The training dataset 410 comprises a number of training examples or training datapoints, where each training example or datapoint includes a text portion and associated annotation information, where the annotation information includes the HNER ground truth for the text portion. In certain implementations, for a particular text portion, the associated annotation or HNER ground truth information identifies, for each hierarchical level, one or more named entities extractable from the text portion, and for each such named entity, a category (or category label) for the named entity. A training datapoint may be a vector of one or more values corresponding to one or more features (or variables).

The length of the text portion can be different in different training datapoints. For example, the text port ion can be a word, a sequence of words, a phrase, a sentence, a sentence fragment, multiple sentences, a paragraph, multiple paragraphs, and the like. The text portions can be transcriptions of audio utterances, where an audio utterance has been converted to text using a speech-to-text converter that also inserts punctuation marks into the resulting text, e.g., commas, semicolons, periods, etc.

The training datapoints in dataset 410 may be received from various sources. In some instances, especially where the HNER functionality is being offered as a cloud service, the training dataset 410 or portions of the dataset may be provided by a client or customer subscribing to the cloud service. In other instances, the training datapoints may be automatically generated from prior libraries of data or obtained from public resources. In certain implementations, publicly available datasets used for HNER training, such as the FewNERD dataset that is available in public domain may be used. The FewNERD dataset contains entities annotated at two hierarchical levels. Examples of other datasets that may also be used for HNER training include CoNLL'03, WikiGold, OntoNotes, WNUT'17, I2B2, etc.

The goal of the training is to enable encoder 415 and HLMs 420-1 to 420-N to perform functions as described above for encoder 215 and HLMs 220 depicted in FIG. 2 and described above. HLMs 420-1 to 420-N can include lightweight network models to balance the load, latency, and time for training the HNER system. Encoder 415 is to be trained to generate encoded representations of the input text portions. Encoder 415 can be a transformer-based encoder model, such as the BERT model. Encoder 415 is to be trained to act as a feature extractor and perform context learning. The encoder may contain weights and biases that can be fined tuned during the training process.

Each HLM is configured to output predictions identifying one or more named entities and associated categories predicted by the HLM for the hierarchical level corresponding to the HLM. For example, in FIG. 4, HLM1 420-1 may output one or more named entities and associated categories predicted by HLM1 for hierarchical level 1; HLM2 420-2 may output one or more named entities and associated categories predicted by HLM2 for hierarchical level 2; HLM3 420-3 may output one or more named entities and associated categories predicted by HLM3 for hierarchical level 3; and so on.

As shown in the training environment 400 depicted in FIG. 4, the output from an HLM is provided as input to a loss determiner (LD) for that hierarchical level. For example, in FIG. 4, the output prediction 424-1 from HLM1 is provided as input to the loss determiner LD1 422-1 for hierarchical level 1; the output prediction 424-2 from HLM2 is provided as input to the loss determiner LD2 422-2 for hierarchical level 2; the output prediction 424-3 from HLM3 is provided as input to the loss determiner LD3 422-3 for hierarchical level 3; and so on. The functions performed by the LDs is described below.

As indicated above, each training datapoint comprises a training text portion and associated annotation information identifying the ground truth information for that level. As part of the training process, the text portions of the training datapoints are provided as inputs to encoder 415 and the corresponding annotations (or HNER ground truth information) is provided to label splitter 418. As previously indicated, for each text portion, the annotation information contains information identifying, for each hierarchical level, the one or more names entities contained in the text portion, and for each named entity, a category associated with the named entity. Label splitter 418 is configured to receive the annotations information for a training text portion and split the information into information for the different hierarchical levels. For example, for an HNER hierarchy of three hierarchical levels, the annotation information is split into: (1) ground truth information for hierarchical level 1; (2) ground truth information for hierarchical level 2; and (3) ground truth information for hierarchical level 3.

Label splitter 418 then, for each hierarchical level, provides the split annotation information for a hierarchical level to a loss determiner (LD) corresponding to the hierarchical level. For example, for an HNER system trained for three hierarchical levels, the system will contain three LDs 422, one (LD1) corresponding to hierarchical level 1, another (LD2) for hierarchical level 2, and the third (LD3) for hierarchical level 3. In this embodiment, label splitter provides the split annotation information for hierarchical level 1 to LD1, provides the split annotation information for hierarchical level 2 to LD2, and provides the split annotation information for hierarchical level 3 to LD3. The split annotation information for each level may include the one or more named entities for the text portion for that hierarchical level and a category for each of the named entities, where the category is selected from a set of categories configured for that level. In certain implementations, the label splitter 418 may send the split annotations information to the LDs in parallel.

For example,

Example #1

Input training text: "Jamaica"
Annotation input to label splitter 418 for input text:
    {[HL1: (Named entity: Jamaica, Category: Location)];
       [HL2: (Named entity: Jamaica, Category: Country)]}

Split Information:

HL1: (Named entity: Jamaica, Category: Location)
→sent to LD1

HL2: (Named entity: Jamaica, Category: Country)
→sent to LD2

Example #2

Input training text: "Nine Miles in Jamaica"

Annotation input to label splitter 418 for input text:

{[HL1: (Named entity: Nine Miles, Category: Location)(Named entity: Jamaica, Category: Location); [(HL2: (Named entity: Nine Miles, Category: City) (Named entity: Jamaica, Category: Country)]}

Split Information:

HL1: (Named entity: Nine Miles, Category: Location)+ (Named entity: Jamaica, Category: Location)→sent to LD1

HL2: (Named entity: Nine Miles, Category: City)+ (Named entity: Jamaica, Category: Country)→sent to LD2

In general, as shown in FIG. 4, label splitter 418 splits the input annotations ground truth information for training text portion and sends: the ground truth information for hierarchical level 1 via path 419-1 to LD 1 422-1 for hierarchical level 1; the ground truth information for hierarchical level 2 via path 419-2 to LD 2 422-2 for hierarchical level 2; the ground truth information for hierarchical level 3 via path 419-3 to LD 3 422-3 for hierarchical level 3, and so on.

As depicted in FIG. 4, the loss determiners (LDs) 422 receive the output predictions of HLMs 420 and the split ground truth information from the label splitter 418. In general, an LD corresponding to a particular hierarchical level receives the prediction of a HLM corresponding to that particular hierarchical level and also receives the split HNER ground truth for that particular hierarchical level. The LD then calculates a loss value for that particular hierarchical level based upon the HLM prediction and the split ground truth for that level. The loss is a value indicative of how much the prediction of the HLM deviates from the ground truth for that level. For example, LD1 422-1 corresponding to hierarchical level 1 receives the prediction from HLM1 420-1 and the corresponding ground truth from label splitter 418, and calculates a loss value for hierarchical level 1 based upon the prediction and the ground truth. Similarly, LD2 422-2 corresponding to hierarchical level 2 receives the prediction from HLM2 420-2 and the corresponding ground truth from label splitter 418, and calculates a loss value for hierarchical level 2 based upon the prediction and the ground truth; LD3 422-3 corresponding to hierarchical level 3 receives the prediction from HLM3 420-3 and the corresponding ground truth from label splitter 418, and calculates a loss value for hierarchical level 3 based upon the prediction and the ground truth; and so on. The different LDs may calculate the losses in parallel with each other. Further, the loss calculated by an LD is independent of the processing performed by another LD.

In certain embodiments, if a LD receives multiple named entity-category pairs from a HLM and label splitter 418 for the same hierarchical level, the LD may calculate a loss value for each received named entity-category pair. In an alternative embodiment, the LD may buffer several named entity-category pairs for the same hierarchical level and calculate a loss value for the received pairs. A loss value can be construed to measure the difference between the output inferred using an HLM and the split HNER ground truth annotated to the text portion of the training datapoints. In some embodiments, the LDs 422 may calculate the loss values 425 using cross-entropy loss function. In other embodiments, the loss values 425 may be calculated by LDs 422 using other types of loss functions, including but not limited to, means square error, likelihood loss, and others.

As shown in FIG. 4, each LD is configured to calculate a loss based upon inputs received by the LD including the prediction output of the HLM and the corresponding ground truth. The multiple losses (425-1 to 425-N) calculated by the multiple LDs (422-1 to 422-N) are then provided to a loss aggregator 430. Loss aggregator 430 is configured to aggregate the losses received from the multiple LDs and generate a final aggregated loss value 432. In some embodiments, the loss values calculated by each of the LDs 422 may be forwarded to the loss aggregator 430 in parallel. In some other embodiments, the losses may be forwarded in a certain sequence desired by the loss aggregator 430.

Various different aggregation techniques may be used by loss aggregator 430 to generate aggregated loss 432. In certain implementations, the following parameterized aggregated loss function may be used:

$$\text{aggregated\_loss} = (a_1 * \text{level\_1\_loss} + a_2 * \text{level\_2\_loss} + \ldots + a_n * \text{level\_}n \text{ loss})$$

where, $a_1, a_2, \ldots, a_n$ are values that correspond to the weights assigned to the loss values generated by LDs 422 for the different hierarchical levels.

For example, $a_1$ is the weight assigned to the loss calculated for level 1, as is the weight assigned to the loss calculated for level 2, $a_3$ is the weight assigned to the loss calculated for level 3, and so on. Per the equation above, the aggregated loss represents a total of the losses of N hierarchical levels. In alternative embodiments, other loss aggregation strategies may be used such as Gradient Normalization, Dynamic Weight Average, Random Loss Weighing, and others.

Different techniques may be used to determine the values for weight parameters, $a_1, a_2, \ldots, a_n$. In one embodiment, according to equal weighted approach, each of the weights is set to a value of 0.5. In certain implementations, the parameter values may be determined through hyperparameter tuning strategies. The parameters may also depend on types of datasets.

In some embodiments, the training framework may perform multiple iterations to train the models in the HNER system using different values of the parameters to determine which combination of parameter values gives the best results. For example, the parameters values may be changed one at a time and the evaluation matrix recorded for each iteration until values of the evaluation metrics reach a threshold or an optimal value. In various embodiments, the training framework may give more weights (or weightage) to the more specific levels (or outer-layers) than the coarser levels (or inner-layers) of the hierarchy, or vice versa. Additionally, the trainable parameters (e.g., weights) in the encoder 415 have been reflected in various loss values calculated by the LDs 422 that receive the predicted results from HLMs 420 because the calculated loss values are used to update trainable parameters across the entire HNER system (including the encoder) via back-propagation. Because the loss aggregator 430 combines all the loss values from different levels of hierarchy, it takes into account the correlation among different levels of hierarchy to produce more accurate predictions.

The aggregated loss generated by loss generator 430 is then provided to a loss minimization sub-system 440, which uses minimization techniques to minimize the loss. In certain implementations, back-propagation techniques are used to minimize the losses. As part of backpropagation processing, with each training iterations, the trainable parameters (e.g., weights) associated the HLM models and the encoder model are updated to minimize the aggregated loss and improve performance. In some embodiments, the trainable parameters may include, but not limited to, weights and biases within the encoder 415 and each HLM of the system of models 420. The process of fine-tuning or updating trainable parameters continues until the loss minimization sub-system finds a set of model parameters that minimize the aggregated loss to within desired limits.

As discussed above, during each iteration of the training process, an aggregated loss is computed based upon the losses computed by the individual loss determiners for the outputs predicted by the various HLMs. The weights associated with the encoder and HLM models are updated. One or more hyperparameters controlling the training environment may also be updated during each iteration to improve performance. Training is ended when the HNER system performs at some acceptable level, The models can then be deployed for performing real-time inferencing on real text portion inputs.

As discussed above, the HNER system is scalable. To add more levels of data hierarchy in the hierarchical training datasets, the HNER system can add new HLMs for the hierarchical levels being added. On the other hand, to remove an existing hierarchical level, an HLM corresponding to that hierarchical level can be removed from the system of models 420. Furthermore, to add, remove, or change categories for a particular hierarchical level, the training environment for HNER system 400 can re-configure and retrain the HLM 420 for that particular level.

FIG. 5 illustrates a process flow for training an HNER system, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

When setting up the training environment for training the HNER system 400, a ML model may be selected for the encoder for the HNER system. A number of HLMs needed for the HNER system are selected based on the number of hierarchical levels for which the HNER system is to be trained. A ML model is also selected for each HLM. Thereafter, initial trainable parameters (e.g., weights) for the encoder and HLMs and the hyperparameters for the training environment are set appropriately.

In the training phase, at 502, the HNER system 400 receives training datasets of HNER data. The training dataset (e.g., dataset 410 of FIG. 4) may comprise training examples (or training datapoints) that include text portions and associated annotation information including HNER ground truth for text portions. At 503, the HNER system 400 selects a training datapoint from the training dataset and performs training for the selected training datapoint because some datapoints may be used for validation. For each selected training datapoint, at 504, the text portion is provided to an encoder that encodes the received text portion of a training datapoint into an encoded representation. At 506, the associated annotation information (i.e., the ground truth for the text portion) is provided to a label splitter that splits the HNER ground truth for the text portion of the training datapoint according to their respective hierarchical levels. In some embodiments, one or more named entities and categories may belong to a hierarchical level in the HNER ground truth. At 508, the encoded representation generated in 504 is provided to each hierarchical level model (HLM) (e.g., HLMs 420 of FIG. 4) in parallel. At 510, the HNER ground truth is split for each of the hierarchical level, and each split portion of the HNER ground truth is provided to a corresponding loss determiner for that level of hierarchy in parallel. At 511, each HLM of the HNER system 400 extracts (i.e., predicts) one or more named entities from the input text portion for a hierarchical level corresponding to that model, and predicts a category for each named entity independently and/or in parallel, where each predicted category is from a set of categories preconfigured for that hierarchical level. At 512, for each HLM of the system of models, a loss is calculated based on the prediction made by that HLM in 511 and the split portion of HNER ground truth received by a corresponding loss determiner for that level of hierarchy in 510 independently and/or in parallel. At 514, all loss values calculated for the system of models in 512 are aggregated into an aggregated loss value through an aggregation loss function for the HNER system 400. At 516, the training process may determine whether the model trainable parameters inside the HNER system 400 have been optimized using loss minimization techniques such that the aggregated loss computed in 514 is minimized (i.e., the model predictions are accurate enough) by reaching a particular threshold. If the threshold is not reached, at 518, the trainable parameters (e.g., weights) of an encoder and the system of models in the HNER system 400 are updated based on the aggregated loss value using back-propagation techniques. Then the process continues to step 503 which reiterates steps 504 to 518 to perform training for each training datapoint. At 516, if the threshold is reached, the process proceeds to 519 where the training process may perform validation using validation training data. At 520, if validation is not successful, the training process continues to step 503. If the validation is successful, the encoder model and system of models are deployed for real-time inferencing at 522.

An HNER system trained as described herein provides more accurate results that existing systems. An example of the improvements is depicted in Table A shown below. Table A shows performance scores comparing the performance of an HNER system as trained and described herein with an HNER system that uses a flat-hierarchy model, which only considers the final level of the hierarchical labels for training. The table lists the f1 score, precision and recall obtained on the test set of Few-Nerd dataset after 1, 5, 10 and 15 epochs of training. For example, for 5 epoch of training, the f1 score of the trained HNER system described in the present disclosure is 0.6179 (higher, i.e., better performance and accuracy) while the f1 score of a flat-hierarchy model is 0.5993.

TABLE A

| Epochs | Score | Flat-hierarchy model | HNER system |
|---|---|---|---|
| 1 | f1_score: | 0.3903 | 0.4779 |
| | precision: | 0.4231 | 0.5165 |
| | recall: | 0.3622 | 0.4446 |

TABLE A-continued

| Epochs | Score | Flat-hierarchy model | HNER system |
|--------|-------|---------------------|-------------|
| 5 | f1_score: | 0.5993 | 0.6179 |
|   | precision: | 0.5926 | 0.6172 |
|   | recall: | 0.6062 | 0.6185 |
| 10 | f1_score: | 0.6141 | 0.6251 |
|   | precision: | 0.6109 | 0.6295 |
|   | recall: | 0.6173 | 0.6206 |
| 15 | f1_score: | 0.6189 | 0.6301 |
|   | precision: | 0.6210 | 0.6316 |
|   | recall: | 0.6169 | 0.6272 |

The examples depicted in Table A above are merely examples and not intended to unduly limit the scope of claimed embodiments. One of ordinary skill in the art would recognize many possible variations, alternatives, and modifications.

The HNER system described in this present disclosure provides advancements and improvements over existing approaches. For instance, in certain embodiments, the disclosed HNER system uses one HLM for each hierarchical level, which is trained to extract one or more NEs and predict a category for each extracted NE at the hierarchical level corresponding to the HLM independently and in parallel. The parallel architecture and the independence of the level models makes the disclosed HNER system scalable and flexible. In addition, changes can also be made to a particular hierarchical level by changing and retraining the HLM for that level. That makes HNER system flexible and reconfigurable.

A novel training technique used for training various models in the HNER system including the encoder model and the hierarchical level models ("HLMs") in the system of models utilizes an encoder to encode the text portion of received training datapoints and a label splitter to split the HNER ground truth for the text portion into different hierarchical levels. The training environment enables the parallel training of the HLMs. Additionally, a training loss is computed for each HLM being trained, and an aggregated loss is calculated for the entire system, including the encoder and the system of models. As a result, the correlation between the categories at the different hierarchical levels is trained into the system, and thus, enable the HNER system to leverage the hierarchical structure of the categories.

In certain implementations, the functionalities provided by an HNER system, as described herein, may be offered as cloud services by a CSP. The HNER system may be implemented using infrastructure provided by the CSP. Customers subscribing to the service can then use the service to send text portions to the service for categorization and receive HNER results from the service. The following sections describe examples of cloud architectures that may be used to implement an HNER processing service according to certain embodiments.

Example Cloud Architectures

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
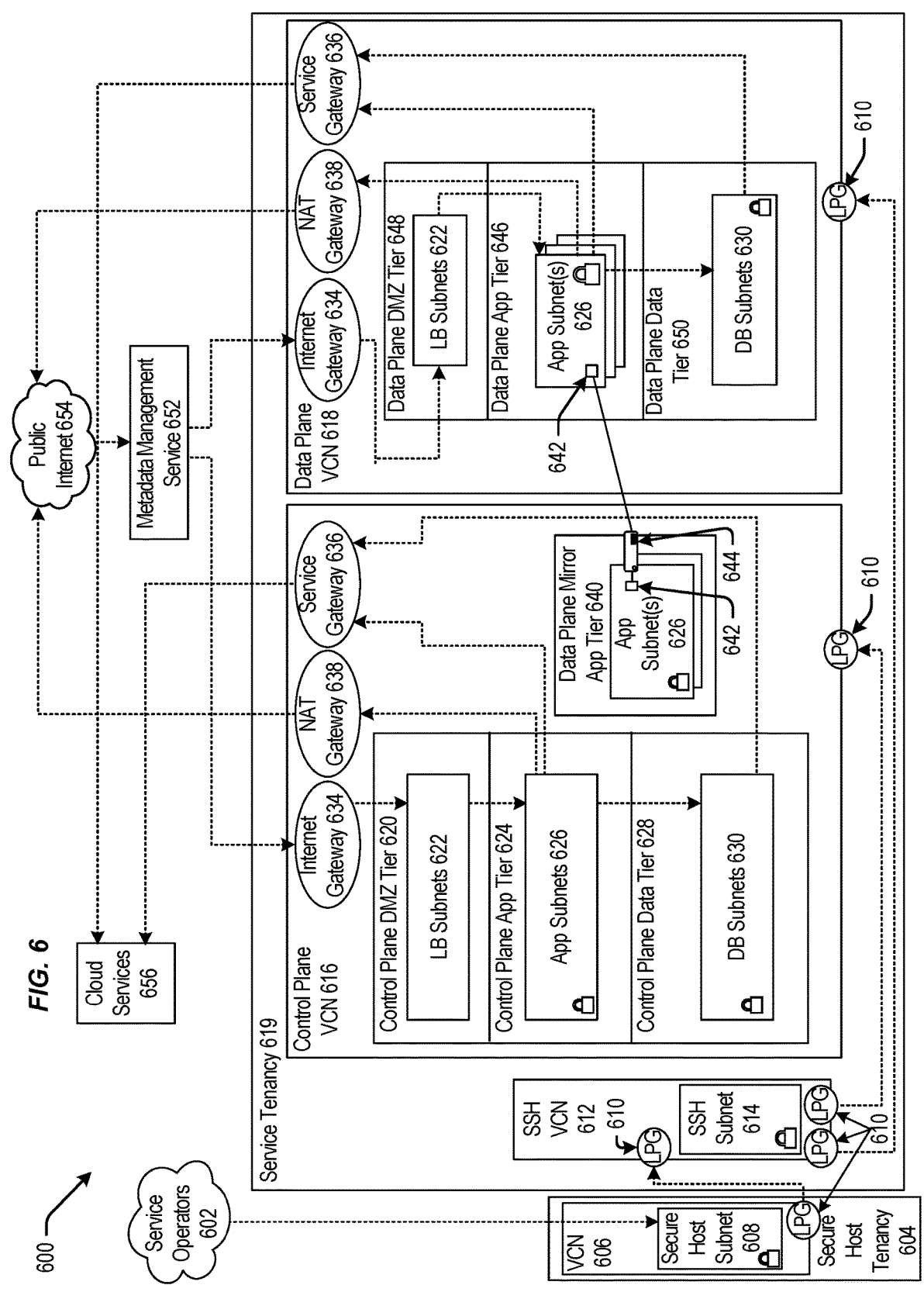
FIG. 6 is a block diagram illustrating an example pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
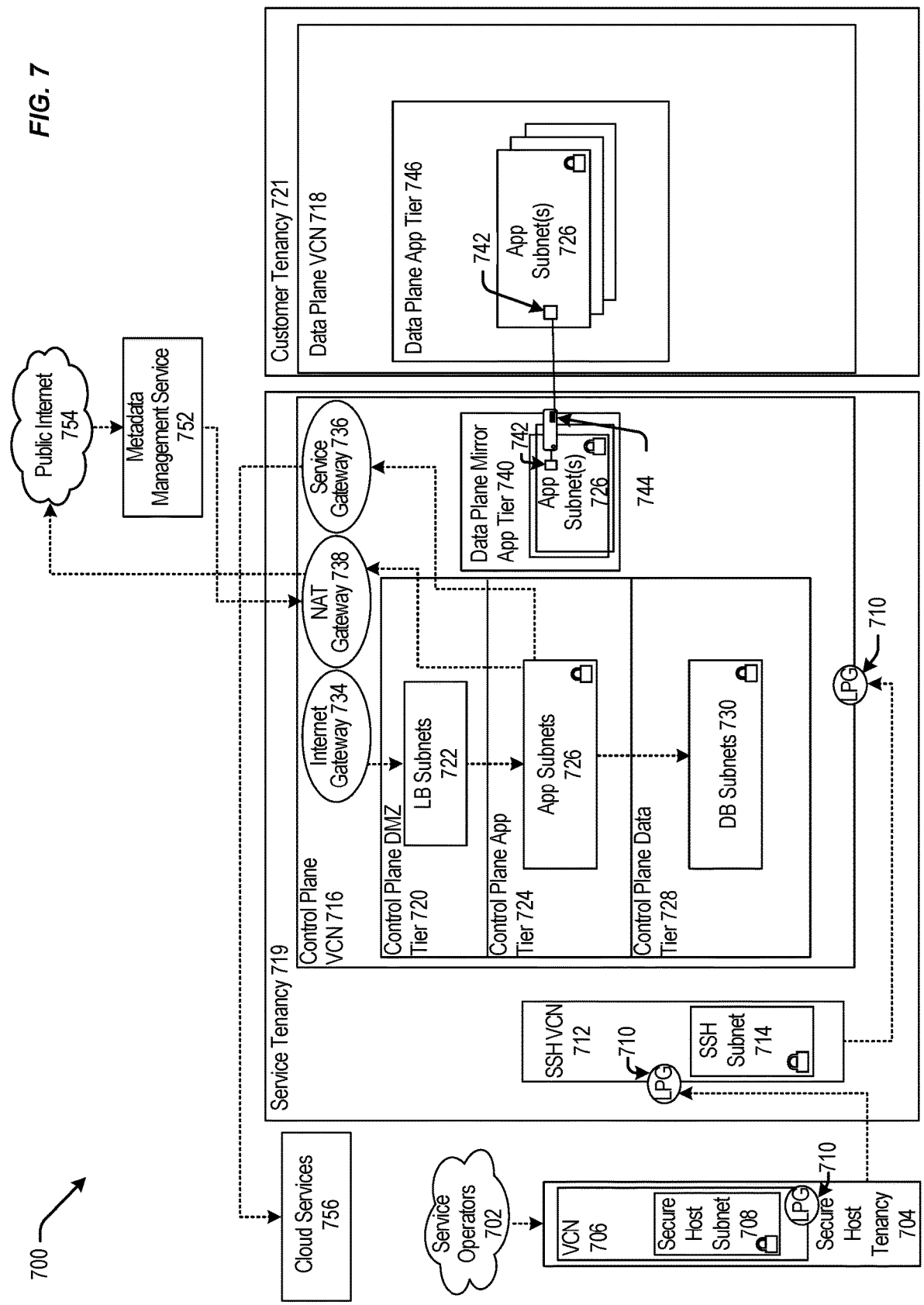
FIG. 7 is a block diagram illustrating another example pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
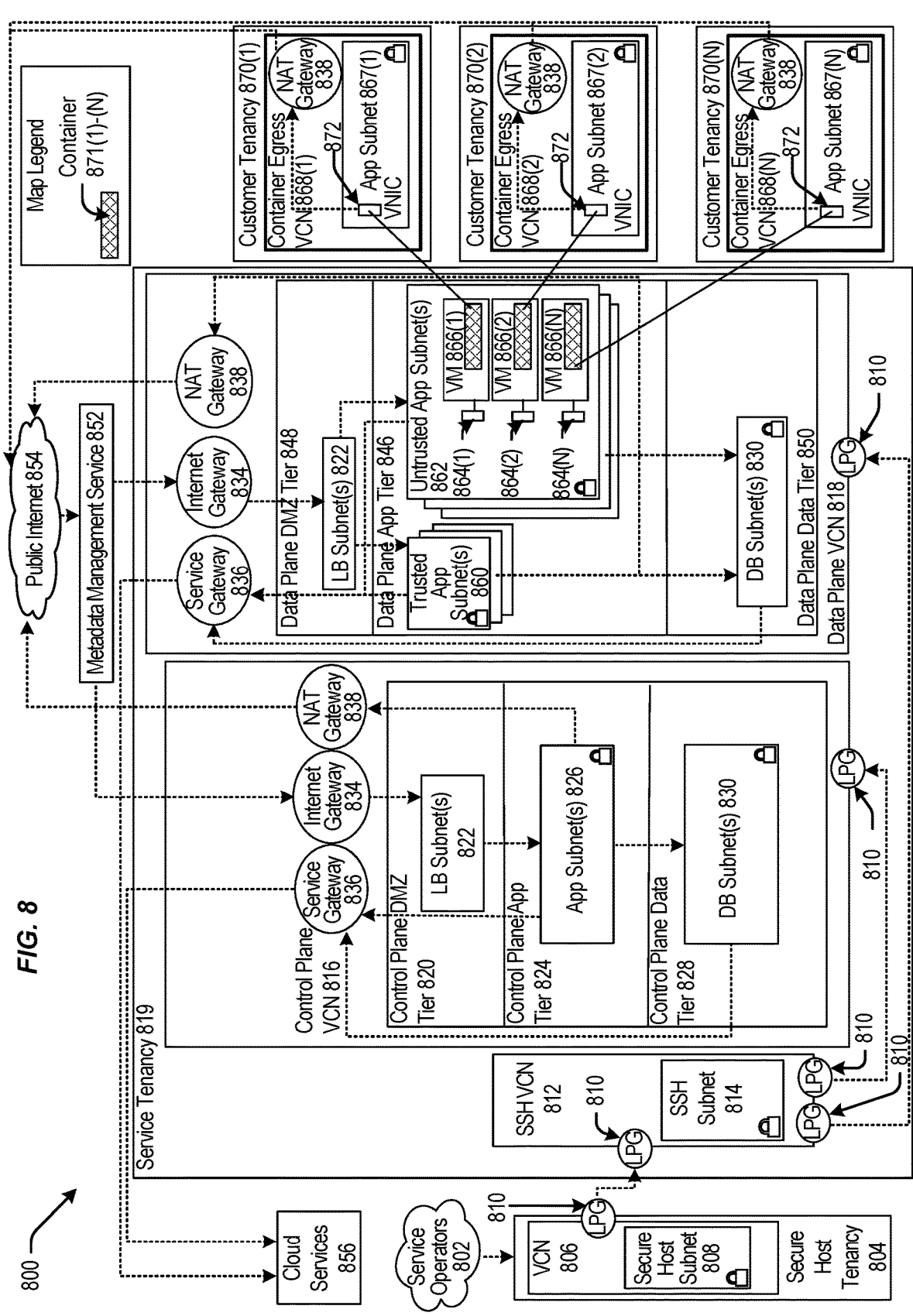
FIG. 8 is a block diagram illustrating another example pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
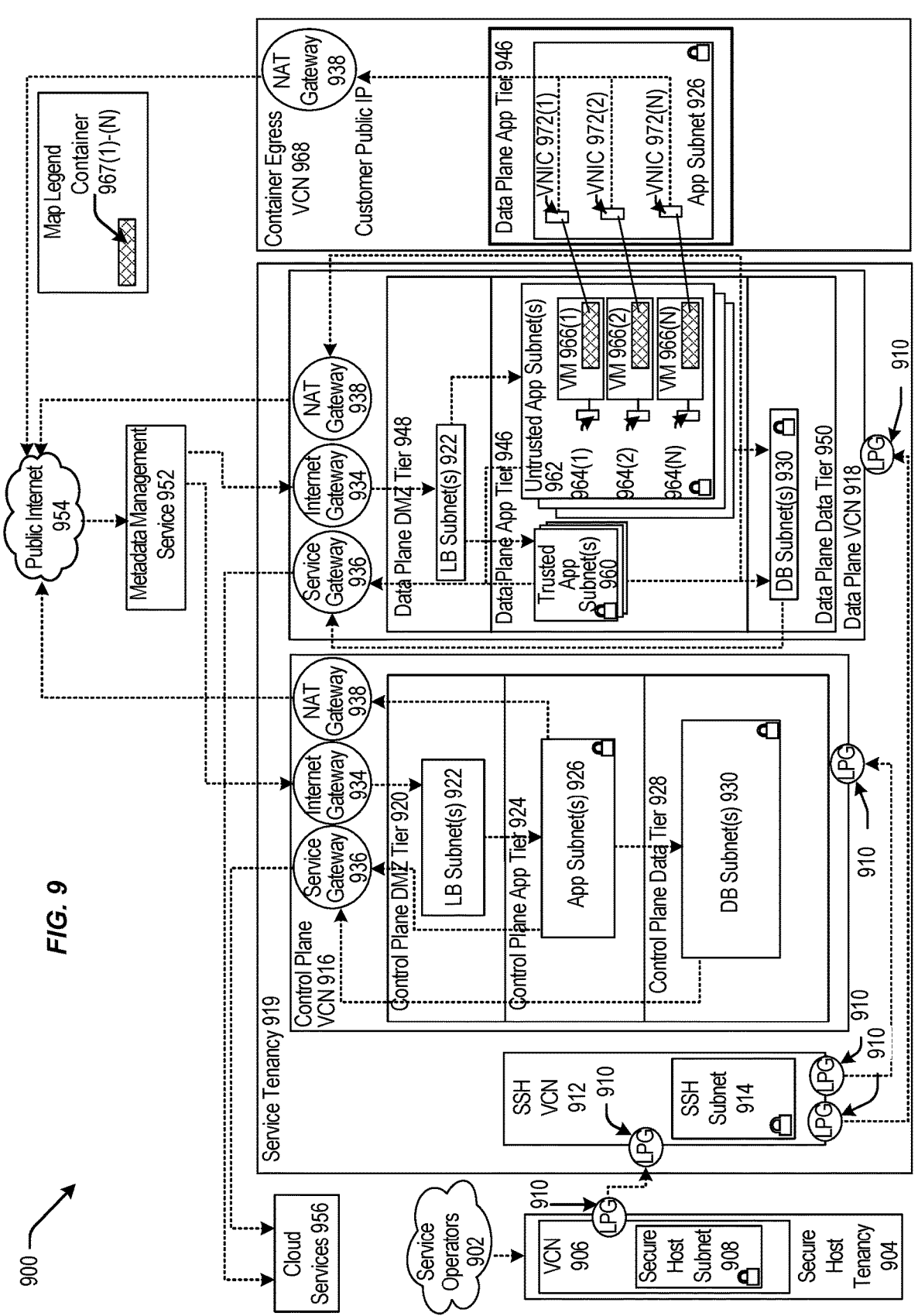
FIG. 9 is a block diagram illustrating another example pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators

602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage sub system 1018 and a communications sub system 1024. Storage sub system 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/ or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

providing a text portion as input to a hierarchical named entity recognition ("HNER") system comprising a plurality of hierarchical level models corresponding to different hierarchical levels of a hierarchy, the plurality of hierarchical level models including a first hierarchical level model corresponding to a first hierarchical level and a second hierarchical level model corresponding to a second hierarchical level, wherein each hierarchical level model corresponding to a hierarchical level is trained to output, for a named entity, a category from a plurality of categories corresponding to the hierarchical level;

identifying, using the first hierarchical level model, a first category for the first hierarchical level for a first named entity extracted from the text portion, wherein the first category is selected from a first plurality of categories that the first hierarchical level model is trained to predict, the first plurality of categories corresponding to the first hierarchical level;

identifying, using the second hierarchical level model, a second category for the second hierarchical level for a second named entity extracted from the text portion, wherein the second category is selected from a second plurality of categories that the second hierarchical level is trained to predict, the second plurality of categories corresponding to the second hierarchical level;

wherein the identifying the first category using the first hierarchical level model is performed independently of the identifying the second category using the second hierarchical level model;

computing, for each hierarchical level in the hierarchy, a hierarchical level loss for the hierarchical level based upon the output generated by a hierarchical level model from the plurality of hierarchical level models corresponding to the hierarchical level and ground truth information for the hierarchical level identified from annotation information associated with at least a first training datapoint in a plurality of training datapoints used to train the plurality of hierarchical level models; and updating the plurality of hierarchical level models based at least in part on the hierarchical level loss computed for each hierarchical level in the hierarchy, wherein updating the plurality of hierarchical level models comprises updating one or more trainable parameters associated with the plurality of hierarchical level models to minimize an aggregate loss for the HNER system.

2. The method of claim 1, wherein the first named entity and the second named entity are the same named entity.

3. The method of claim 1, further comprising identifying, using the first hierarchical level model, a third category for the first hierarchical level for a third named entity extracted from the text portion, wherein the third category is selected from a third plurality of categories that the first hierarchical level model is trained to predict, the third plurality of categories corresponding to the first hierarchical level.

4. The method of claim 1, wherein identifying the first category using the first hierarchical level model is performed in parallel with identifying the second category using the second hierarchical level model.

5. The method of claim 1, further comprising outputting information indicative of the first named entity, the first category, the second named entity, and the second category.

6. The method of claim 1, further comprising:

generating, by an encoder of the HNER system, an encoded representation of the text portion; and providing the encoded representation to both the first hierarchical level model and to the second hierarchical level model.

7. The method of claim 6, wherein the encoder is a Bidirectional Encoder Representations from Transformers ("BERT") model.

8. The method of claim 6, wherein the providing comprises providing the encoded representation to the first hierarchical level model and the second hierarchical level model in parallel.

9. The method of claim 6, further comprising training the encoder and the plurality of hierarchical level models using the plurality of training data points.

10. The method of claim 9, wherein training the plurality of hierarchical level models comprises:

training the first hierarchical level model to predict categories in the first plurality of categories corresponding to the first hierarchical level; and training the second hierarchical level model to predict categories in the second plurality of categories corresponding to the second hierarchical level.

11. The method of claim 10, wherein training the encoder and the plurality of hierarchical level models comprises:

for the first training datapoint in the plurality of training datapoints, providing a text portion of the first training datapoint to the encoder;

based upon the annotation information associated with the first training datapoint, identifying, for each hierarchical level in the hierarchy, the ground truth information for the hierarchical level, wherein the ground truth information for the hierarchical level comprises information indicative of a named entity in the text portion of the first training datapoint and a category for the named entity, wherein the category is one of a plurality of categories corresponding to the hierarchical level;

generating by the encoder an encoded representation for the text portion of the first training datapoint;

providing the encoded representation for the text portion of the first training datapoint to each hierarchical level in the plurality of hierarchical level models; and generating, by each hierarchical level model in the plurality of hierarchical level models, a prediction for the text portion of the first training datapoint, wherein the prediction by a hierarchical level model identifies a named entity extracted by the hierarchical level model from the text portion of the first training datapoint for that hierarchical level corresponding to the hierarchical level model and a category predicted by the hierarchical level model for the extracted named entity, wherein the category predicted by the hierarchical level model is from a plurality of categories for the hierarchical level.

12. The method of claim 11, wherein training the encoder and the plurality of hierarchical level models further comprises:

generating the aggregate loss based upon the hierarchical level losses computed for a plurality of hierarchical levels; and minimizing the aggregate loss using a loss minimization technique, wherein the minimizing comprises updating the encoder and the plurality of hierarchical level models.

13. The method of claim 12, wherein updating the encoder and the plurality of hierarchical level models further comprises updating one or more trainable parameters associated with the encoder and the plurality of hierarchical level models.

14. The method of claim 12, wherein the loss minimization technique is cross-entropy loss function.

15. A non-transitory computer-readable storage medium storing computer-executable instructions that, when executed by one or more processors, cause the one or more processors to perform operations comprising:

providing a text portion as input to a hierarchical named entity recognition ("HNER") system comprising a plurality of hierarchical level models corresponding to different hierarchical levels of a hierarchy, the plurality of hierarchical level models including a first hierarchical level model corresponding to a first hierarchical level and a second hierarchical level model corresponding to a second hierarchical level, wherein each hierarchical level model corresponding to a hierarchical level is trained to output, for a named entity, a category from a plurality of categories corresponding to the hierarchical level;

identifying, using the first hierarchical level model, a first category for the first hierarchical level for a first named entity extracted from the text portion, wherein the first category is selected from a first plurality of categories that the first hierarchical level model is trained to predict, the first plurality of categories corresponding to the first hierarchical level; and identifying, using the second hierarchical level model, a second category for the second hierarchical level for a second named entity extracted from the text portion, wherein the second category is selected from a second plurality of categories that the second hierarchical level is trained to predict, the second plurality of categories corresponding to the second hierarchical level, wherein the identifying the first category using the first hierarchical level model is performed independently of and in parallel with the identifying the second category using the second hierarchical level model;

computing, for each hierarchical level in the hierarchy, a hierarchical level loss for the hierarchical level based upon the output generated by a hierarchical level model from the plurality of hierarchical level models corresponding to the hierarchical level and ground truth information for the hierarchical level identified from annotation information associated with at least a first training datapoint in a plurality of training datapoints used to train the plurality of hierarchical level models; and updating the plurality of hierarchical level models based at least in part on the hierarchical level loss computed for each hierarchical level in the hierarchy, wherein updating the plurality of hierarchical level models comprises updating one or more trainable parameters associated with the plurality of hierarchical level models to minimize an aggregate loss for the HNER system.

16. The non-transitory computer-readable storage medium of claim 15, further comprising:

generating, by an the encoder of the HNER system, an encoded representation of the text portion; and providing the encoded representation to both the first hierarchical level model and to the second hierarchical level model in parallel.

17. The non-transitory computer-readable storage medium of claim 16, further comprising:

training the encoder and the plurality of hierarchical level models using the plurality of training datapoints;

for the first training datapoint in the plurality of training datapoints, providing a text portion of the first training datapoint to the encoder;

based upon the annotation information associated with the first training datapoint, identifying, for each hierarchical level in the hierarchy, the ground truth information for the hierarchical level, where the ground truth information for the hierarchical level comprises information indicative of a named entity in the text portion of the first training datapoint and a category for the named entity, wherein the category is one of a plurality of categories corresponding to the hierarchical level;

generating by the encoder an encoded representation for the text portion of the first training datapoint;

providing the encoded representation for the text portion of the first training datapoint to each hierarchical level in the plurality of hierarchical level models; and generating, by each hierarchical level model in the plurality of hierarchical level models, a prediction for the text portion of the first training datapoint, where the prediction by a hierarchical level model identifies a named entity extracted by the hierarchical level model from the text portion of the first training datapoint for that hierarchical level corresponding to the hierarchical level model and a category predicted by the hierarchical level model for the extracted named entity, wherein the category predicted by the hierarchical level model is from a plurality of categories for the hierarchical level.

18. A system, comprising:

one or more processors; and one or more memories storing computer-executable instructions that, when executed by the one or more processors, cause the system to perform:

providing a text portion as input to a hierarchical named entity recognition ("HNER") system comprising a plurality of hierarchical level models corresponding to different hierarchical levels of a hierarchy, the plurality of hierarchical level models including a first hierarchical level model corresponding to a first hierarchical level and a second hierarchical level model corresponding to a second hierarchical level, wherein each hierarchical level model corresponding to a hierarchical level is trained to output, for a named entity, a category from a plurality of categories corresponding to the hierarchical level;

identifying, using the first hierarchical level model, a first category for the first hierarchical level for a first named entity extracted from the text portion, wherein the first category is selected from a first plurality of categories that the first hierarchical level model is trained to predict, the first plurality of categories corresponding to the first hierarchical level; and identifying, using the second hierarchical level model, a second category for the second hierarchical level for a second named entity extracted from the text portion, wherein the second category is selected from a second plurality of categories that the second hierarchical level is trained to predict, the second plurality of categories corresponding to the second hierarchical level, wherein the identifying the first category using the first hierarchical level model is performed independently of and in parallel with the identifying the second category using the second hierarchical level model;

computing, for each hierarchical level in the hierarchy, a hierarchical level loss for the hierarchical level based upon the output generated by a hierarchical level model from the plurality of hierarchical level models corresponding to the hierarchical level and ground truth information for the hierarchical level identified from annotation information associated with at least a first training datapoint in a plurality of training datapoints used to train the plurality of hierarchical level models; and updating the plurality of hierarchical level models based at least in part on the hierarchical level loss computed for each hierarchical level in the hierarchy, wherein updating the plurality of hierarchical level models comprises updating one or more trainable parameters associated with the plurality of hierarchical level models to minimize an aggregate loss for the HNER system.

19. The system of claim 18, further comprising:

generating, by an encoder of the HNER system, an encoded representation of the text portion; and providing the encoded representation to both the first hierarchical level model and to the second hierarchical level model in parallel.

20. The system of claim 19, further comprising:

training the encoder and the plurality of hierarchical level models using the plurality of training datapoints;

for the first training datapoint in the plurality of training datapoints, providing a text portion of the first training datapoint to the encoder;

based upon the annotation information associated with the first training datapoint, identifying, for each hierarchical level in the hierarchy, the ground truth information for the hierarchical level, where the ground truth information for the hierarchical level comprises information indicative of a named entity in the text portion of the first training datapoint and a category for the named entity, wherein the category is one of a plurality of categories corresponding to the hierarchical level;

generating by the encoder an encoded representation for the text portion of the first training datapoint;

providing the encoded representation for the text portion of the first training datapoint to each hierarchical level in the plurality of hierarchical level models; and generating, by each hierarchical level model in the plurality of hierarchical level models, a prediction for the text portion of the first training datapoint, where the prediction by a hierarchical level model identifies a named entity extracted by the hierarchical level model from the text portion of the first training datapoint for that hierarchical level corresponding to the hierarchical level model and a category predicted by the hierarchical level model for the extracted named entity, wherein the category predicted by the hierarchical level model is from a plurality of categories for the hierarchical level.

* * * * *